US011785292B2

(12) United States Patent
Nakade et al.

(10) Patent No.: US 11,785,292 B2
(45) Date of Patent: *Oct. 10, 2023

(54) INFORMATION PROCESSING TERMINAL AND SYSTEM

(71) Applicant: MAXELL, LTD., Kyoto (JP)

(72) Inventors: Mayumi Nakade, Tokyo (JP); Takashi Matsubara, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,642

(22) Filed: Aug. 10, 2022

(65) Prior Publication Data
US 2022/0385972 A1    Dec. 1, 2022

Related U.S. Application Data

(63) Continuation of application No. 17/093,007, filed on Nov. 9, 2020, now Pat. No. 11,438,648, which is a
(Continued)

(51) Int. Cl.
*H04N 21/442* (2011.01)
*H04N 21/422* (2011.01)
(Continued)

(52) U.S. Cl.
CPC ..... *H04N 21/44204* (2013.01); *G06V 40/169* (2022.01); *H04N 21/41265* (2020.08);
(Continued)

(58) Field of Classification Search
CPC ......... H04N 21/44204; H04N 21/4126; H04N 21/42201; H04N 21/4415; H04N 21/442; H04N 21/44213
See application file for complete search history.

(56) References Cited

U.S. PATENT DOCUMENTS 8,831,409 B1    9/2014    Chang et al.
8,863,177 B2    10/2014   Cha et al.
(Continued)

FOREIGN PATENT DOCUMENTS

CN    103260058 A    8/2013
EP    1134972 A2    9/2001
(Continued)

OTHER PUBLICATIONS

Japanese Notice of Reasons for Refusal issued in corresponding Japanese Patent Application No. 2018-520268, dated Jul. 14, 2020, with English translation.
(Continued)

*Primary Examiner* — Jason Salce
(74) *Attorney, Agent, or Firm* — McDermott Will & Emery LLP

(57) ABSTRACT

An information processor includes: a user information acquiring unit acquiring user information for identifying a user; a display; a viewing time measuring unit measuring a viewing time during which a previously-registered user views contents information on the display; and a controller. The controller determines whether the user is the registered user, based on the user information and registered user information for identifying the registered user. When the user is the registered user, the controller causes the display to display the contents information, causes the viewing time measuring unit to measure the viewing time, compares a cumulative viewing time that is a total of the viewing times cumulated within a period of time with a viewing limit time that is a previously-set upper limit of the cumulative viewing time, and gives the registered user a warning when the cumulative viewing time is equal to or longer than the viewing limit time.

38 Claims, 21 Drawing Sheets

Related U.S. Application Data continuation of application No. 16/306,469, filed as application No. PCT/JP2016/066112 on Jun. 1, 2016, now Pat. No. 10,834,459.

(51) Int. Cl.
  *H04N 21/4415* (2011.01)
  *H04N 21/41* (2011.01)
  *G06V 40/16* (2022.01)

(52) U.S. Cl.
  CPC ..... *H04N 21/42201* (2013.01); *H04N 21/442* (2013.01); *H04N 21/4415* (2013.01); *H04N 21/44213* (2013.01)

(56) References Cited

U.S. PATENT DOCUMENTS

| | | | |
|---|---|---|---|
| 9,148,698 | B1 | 9/2015 | Jaini et al. |
| 10,839,459 | B2 * | 11/2020 | Labuszewski ......... G06Q 40/04 |
| 11,438,648 | B2 * | 9/2022 | Nakade .............. H04N 21/4532 |
| 2003/0005135 | A1 | 1/2003 | Inoue et al. |
| 2003/0124973 | A1 | 7/2003 | Sie et al. |
| 2004/0143838 | A1 | 7/2004 | Rose |
| 2009/0011830 | A1 | 1/2009 | Wang et al. |
| 2009/0054100 | A1 | 2/2009 | Ishida |
| 2010/0239227 | A1 | 9/2010 | Bhogal et al. |
| 2011/0072448 | A1 | 3/2011 | Stiers et al. |
| 2012/0050500 | A1 | 3/2012 | Yamaguchi |
| 2014/0016908 | A1 | 1/2014 | Sakaniwa et al. |
| 2014/0047467 | A1 | 2/2014 | Arling et al. |
| 2014/0149562 | A1 | 5/2014 | Xiao et al. |
| 2014/0201632 | A1 | 7/2014 | Kunigita et al. |
| 2014/0208371 | A1 | 7/2014 | Mori et al. |
| 2014/0337920 | A1 | 11/2014 | Giobbi |
| 2015/0106833 | A1 | 4/2015 | Kang et al. |
| 2015/0332576 | A1 | 11/2015 | Son |

FOREIGN PATENT DOCUMENTS

| | | |
|---|---|---|
| EP | 1 814 322 A1 | 8/2007 |
| JP | 2001-339654 A | 12/2001 |
| JP | 2003-131751 A | 5/2003 |
| JP | 2010-093726 A | 4/2010 |
| JP | 2011-514069 A | 4/2011 |
| JP | 3167369 U | 4/2011 |
| JP | 2012-213086 A | 11/2012 |
| JP | 2012-248960 A | 12/2012 |
| JP | 2013-175862 A | 9/2013 |
| WO | 98/21877 A2 | 5/1998 |
| WO | 2006/129443 A1 | 12/2006 |

OTHER PUBLICATIONS

Chinese Office Action issue in corresponding Chinese Patent Application No. 201680086282.9, dated Jul. 30, 2020.
Extended European Search Report issued in corresponding European Patent Application No. 16904003.7-1230, dated Feb. 24, 2020.
Office Action dated Sep. 14, 2021 in U.S. Appl. No. 17/093,007.
Notice of Allowance dated Apr. 28, 2021 in U.S. Appl. No. 17/093,007.
International Search Report issued in corresponding International Patent Application No. PCT/JP2016/066112, dated Aug. 23, 2016, with English Translation.
U.S. PTO Non-Final Office Action issued in related parent U.S. Appl. No. 16/306,469, dated Nov. 29, 2019.
U.S. PTO Notice of Allowance issued in related parent U.S. Appl. No. 16/306,469, dated Jun. 19, 2020.
Related parent U.S. Appl. No. 16/306,469, filed Nov. 30, 2018.
Notice of Allowance issued in related parent U.S. Appl. No. 17/093,007, dated Apr. 28, 2022.
Non-Final Office Action issued in related parent U.S. Appl. No. 17/093,007, dated Sep. 14, 2021.
Office Action issued in corresponding European Application No. 16904003.7 dated Apr. 4, 2023 (14 pages).

* cited by examiner

FIG. 11

| USER ID | ADMINISTRATOR | VIEWING LIMIT TIME | RESET TIME | TOTAL CUMULATIVE VIEWING TIME | VIEWING START TIME | ... |
|---|---|---|---|---|---|---|
| 001 | 1 | — | 3:00:00 | 8:27:32 | 14:30:11 | ... |
| 002 | 0 | 4:00:00 | 3:00:00 | 1:20:20 | 13:50:45 | ... |
| 003 | 0 | 2:00:00 | 3:00:00 | 2:02:20 | 12:30:25 | ... |
| ... | ... | ... | ... | ... | ... | |

FIG. 12

| USER ID | ADMINISTRATOR | VIEWING LIMIT TIME | CONSECUTIVE VIEWING TIME LIMIT | | | |
|---|---|---|---|---|---|---|
| | | | CONSECUTIVE VIEWING LIMIT TIME | BREAK TIME | BREAK END TIME | |
| 001 | 1 | — | — | — | — | ... |
| 002 | 0 | 8:00:00 | 1:00:00 | 00:15:00 | — | ... |
| 003 | 0 | 4:00:00 | 0:30:00 | 00:10:00 | 12:03:40 | ... |
| ... | ... | ... | ... | ... | ... | ... |

FIG. 19

| USER ID | ADMINISTRATOR | VIEWING LIMIT TIME | RESET TIME | PLURAL-PROCESSOR CUMULATIVE VIEWING TIME | EQUIPMENT CURRENTLY USED | |
|---|---|---|---|---|---|---|
| | | | | | EQUIPMENT ID | START TIME |
| 001 | 1 | — | 3:00:00 | 8:27:32 | T000 | 14:30:11 |
| 002 | 0 | 4:00:00 | 3:00:00 | 1:20:20 | T002 | 13:50:45 |
| 003 | 0 | 2:00:00 | 3:00:00 | 2:02:20 | T003 | 12:30:25 |
| ... | ... | ... | ... | ... | ... | ... |

FIG. 21

| USER ID | ADMINISTRATOR | VIEWING LIMIT TIME | RESET TIME | PLURAL-PROCESSOR CUMULATIVE VIEWING TIME | EQUIPMENT CURRENTLY USED | | FACE INFORMATION | ... |
|---|---|---|---|---|---|---|---|---|
| | | | | | EQUIPMENT ID | START TIME | | |
| 001 | 1 | — | 3:00:00 | 8:27:32 | T000 | 14:30:11 | F001 | ... |
| 002 | 0 | 4:00:00 | 3:00:00 | 1:20:20 | T002 | 13:50:45 | F002 | ... |
| 003 | 0 | 2:00:00 | 3:00:00 | 2:02:20 | T003 | 12:30:25 | F003 | ... |
| ... | ... | ... | ... | ... | ... | ... | ... | ... |

INFORMATION PROCESSING TERMINAL AND SYSTEM

CROSS REFERENCE TO RELATED APPLICATIONS

This application is a Continuation of U.S. patent application Ser. No. 17/093,007, filed on Nov. 9, 2020, which is a Continuation of U.S. patent application Ser. No. 16/306,469, filed on Nov. 30, 2018, now U.S. Pat. No. 10,834,459 issued on Nov. 10, 2020, which is the U.S. National Phase under 35 U.S.C. § 371 of International Application No. PCT/JP2016/066112, filed on Jun. 1, 2016, the entire contents of each are hereby incorporated by reference in their entirety.

TECHNICAL FIELD

The present invention relates to an information processor.

BACKGROUND ART

Since smartphones, tablet PCs, etc., have been widely spreading in recent years, videos, etc., distributed through the Internet, etc., can be easily viewed outside and at home. Many users have a plurality of pieces of such information equipment such as a smartphone, a personal computer, and a television, and have along time to view a display without awareness.

Therefore, burden on the user's eye becomes large, and there are concerns such as visual loss and stiff shoulder due to the watching of the display for a long time. In order to particularly suppress influence on children in their growing periods, in particular, it is preferable to limit the time for viewing the display within a certain time. And, parents would like to limit the children's time for viewing the display in some cases because of, for example, their educational policy.

For example, Patent Document 1 discloses a view limiting system including an STB (Set Top Box) serving as a viewing apparatus, a monitor configured to reproduce contents such as moving images and still images received by the STB, user terminals configured to remotely operate the STB through wireless communication, and an administrator terminal configured to set a viewing time limit value in the STB for each user terminal. According to the Patent Document 1, the STB manages a viewing history (viewing time) and a viewing time limit value for each terminal ID that is unique to each user terminal. When receiving a viewing request from the user terminal, the STB compares the viewing time with the viewing time limit value, based on the terminal ID, and permits contents viewing if the viewing time is shorter than the limit value, otherwise rejects the viewing request if not.

RELATED ART DOCUMENT

Patent Document

Patent Document 1: Japanese Patent Application Laid-Open Publication No. 2010-93726

SUMMARY OF THE INVENTION

Problems to be Solved by the Invention

In the view limiting system of the Patent Document 1, although it is determined whether the viewing is permitted or not before the start of the contents viewing, it is not determined whether the viewing is permitted or not during the contents viewing. Therefore, even when a cumulative viewing time exceeds the viewing limit time during viewing of information, the system cannot limit the viewing of information such as contents.

Accordingly, an object of the present invention is to provide an information processor that can limit the viewing even when the cumulative viewing time exceeds the viewing limit time during the viewing of information.

Means for Solving the Problems

The summary of the typical aspects of the inventions disclosed in the present application will be briefly described as follows.

An information processor according to a typical embodiment of the present invention includes: a user information acquiring unit configured to acquire user information for identifying a user; a display; a viewing time measuring unit configured to measure a viewing time during which a previously-registered user views the contents information displayed on the display; and a controller. The controller determines whether the user is the registered user or not, based on the user information and registered user information for identifying the registered user. When it is determined that the user is the registered user, the controller causes the display to display the contents information, causes the viewing time measuring unit to measure the viewing time, compares a cumulative viewing time that is a cumulative total of the viewing times cumulated within a certain period of time with a viewing limit time that is a previously-set upper limit of the cumulative viewing time, and gives a warning to the registered user when it is determined that the cumulative viewing time is equal to or longer than the viewing limit time.

Effects of the Invention

The effects obtained by the typical aspects of the present invention disclosed in the present application will be briefly described below.

That is, according to the typical embodiment of the present invention, an information processor that can limit viewing even when a cumulative viewing time exceeds a viewing limit time during viewing of information can be provided.

BRIEF DESCRIPTIONS OF THE DRAWINGS

FIG. 11 is a diagram showing an example of a method of recording viewing information on a registered user according to the second embodiment of the present invention;

FIG. 12 is a diagram showing an example of a method of managing viewing information on a registered user according to a third embodiment of the present invention;

FIG. 19 is a diagram showing an example of the method of recording the viewing information according to the fifth embodiment of the present invention;

FIG. 21 is a diagram showing an example of the method of recording viewing the information according to the fifth embodiment of the present invention.

BEST MODE FOR CARRYING OUT THE INVENTION

Hereinafter, embodiments of the present invention will be described in detail on the basis of the accompanying drawings. Note that the same components are denoted by the same reference symbols throughout all the drawings for describing the embodiments, and the repetitive description thereof will be omitted. Also, hatching is used even in a plan view so as to make the drawings easy to see.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and others), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle.

Also, when "formed of A", "formed from A", "having A" or "including A" is described for components or others in embodiments, it goes without saying that other components are not eliminated unless otherwise specified to be only the component. Similarly, in the embodiments described below, when the shape of the components, positional relation thereof, and others are mentioned, the substantially approximate and similar shapes and others are included therein unless otherwise stated or except the case where it is conceivable that they are apparently excluded in principle. The same goes for the numerical value and the range described above.

First Embodiment

Figure 1:
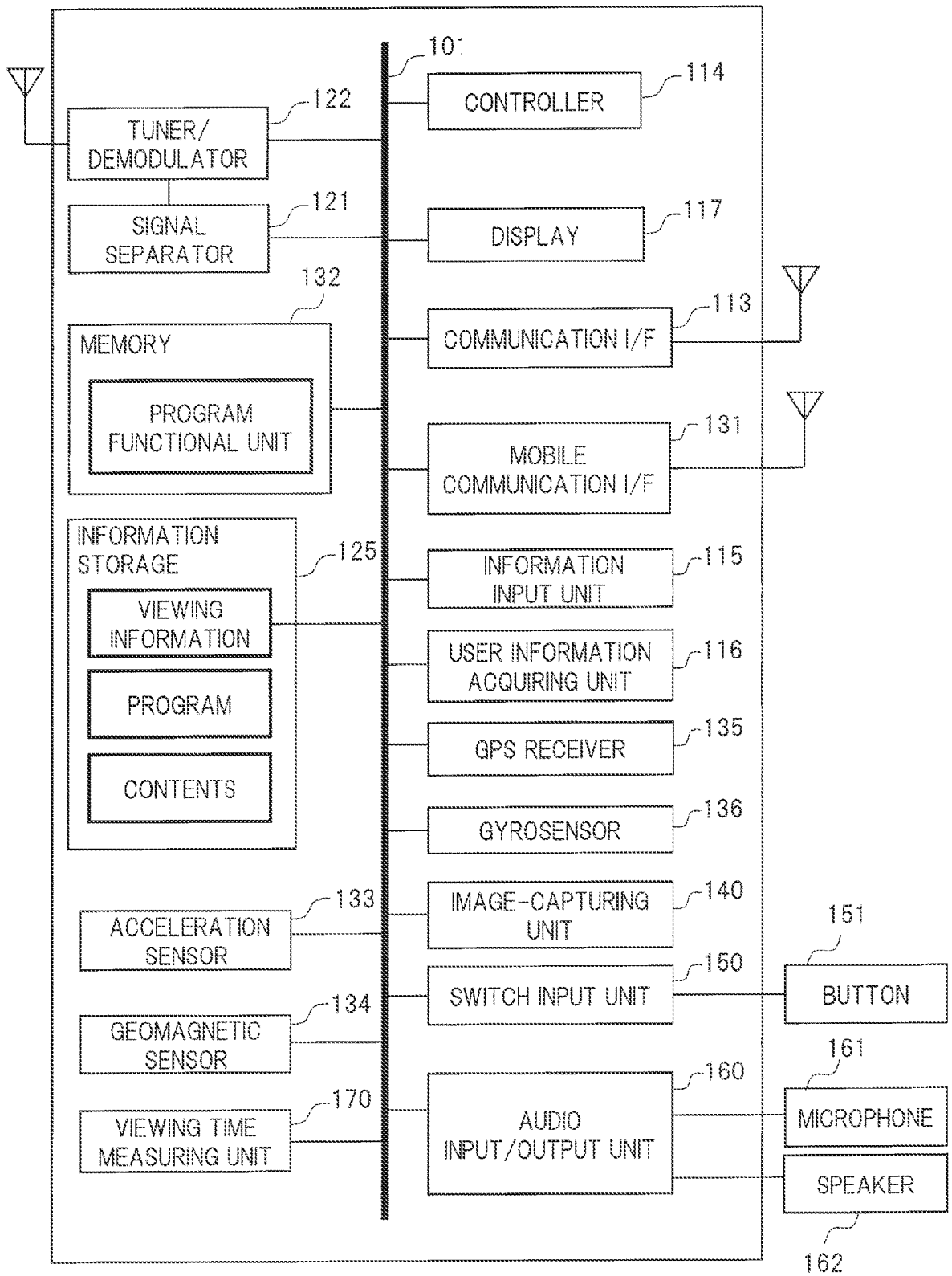
FIG. 1 is a block diagram showing an example of a configuration of an information processor according to a first embodiment of the present invention.
Figure 2:
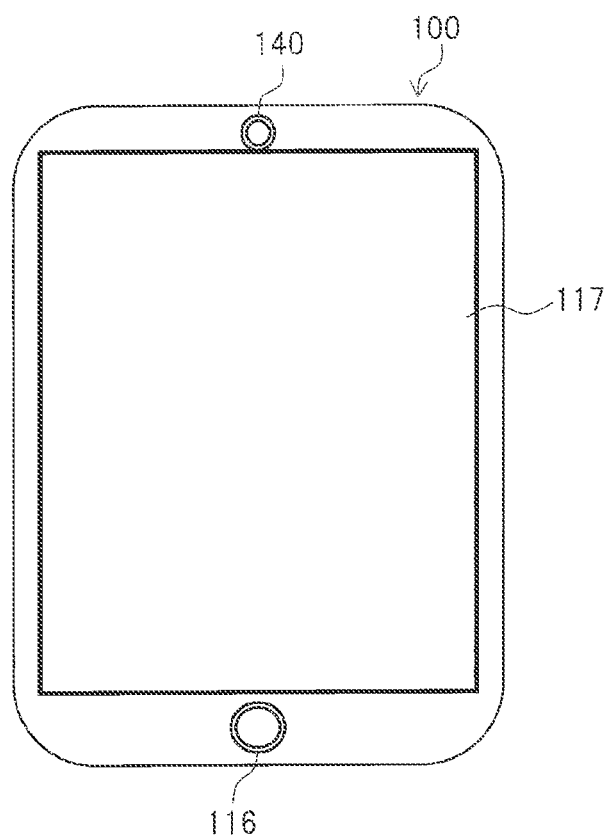
FIG. 2 is a plan view exemplifying one form of the information processor according to the first embodiment of the present invention.
Figure 3:
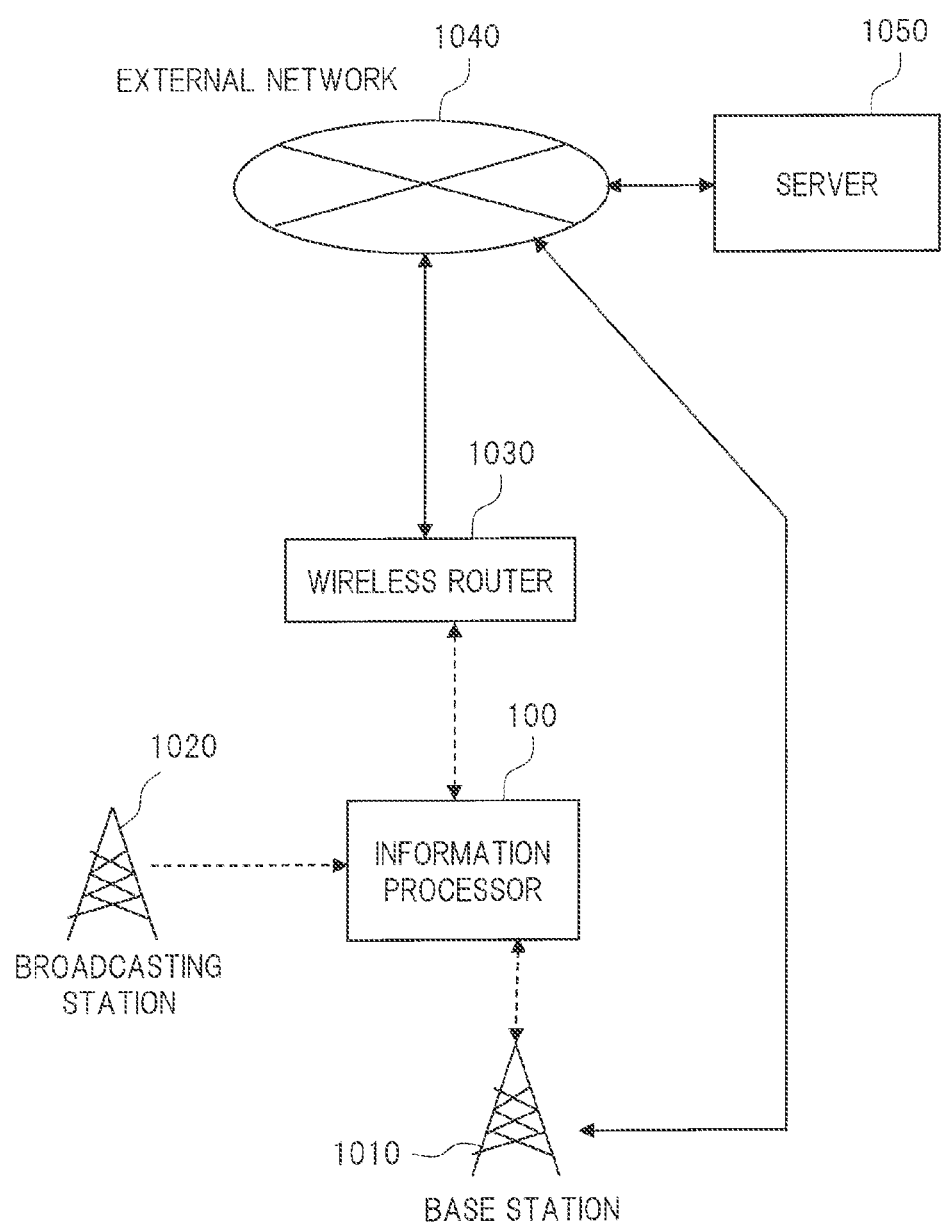
FIG. 3 is a diagram showing an example of a usage situation in the information processor according to the first embodiment of the present invention.

FIG. 1 is a block diagram showing an example of a configuration of an information processor according to a first embodiment of the present invention. FIG. 2 is a plan view exemplifying one form of the information processor according to the first embodiment of the present invention. FIG. 3 is a diagram showing an example of a usage situation in the information processor according to the first embodiment of the present invention.

An information processor 100 according to the present embodiment is, for example, a smartphone, a cellular phone, a tablet terminal, a personal computer, or others. As shown in FIG. 1, the information processor 100 includes a user information acquiring unit 116, a display 117, a viewing time measuring unit 170, and a controller 114. In addition to these components, the information processor 100 further includes an information storage 125, a tuner/demodulator 122, a signal separator 121, a memory 132, an acceleration sensor 133, a geomagnetic sensor 134, a communication I/F 113, a mobile communication I/F 131, an information input unit 115, a GPS receiver 135, a gyrosensor 136, an image-capturing unit 140, a switch input unit 150, and an audio input/output unit 160. These components are connected to one another through a bus 101. To the switch input unit 150, a button 151 is connected. To the audio input/output unit 160, a microphone 161 and a speaker 162 are connected.

As shown in, for example, FIG. 2, the user information acquiring unit 116 is provided on the periphery of the display 117. The user information acquiring unit 116 acquires the user information for identifying the user. The user information acquiring unit 116 is composed of, for example, a biosensor, etc., configured to read biological information, and acquires biological information such as a fingerprint and a finger venous pattern as the user information, via the biosensor. When a password input by the user is acquired as the user information, the information input unit 115 described later may function also as the user information acquiring unit. Further, a touch panel composed by monolithically forming the information input unit 115 and the display 117 described later may also function as the user information acquiring unit. When face information extracted from a user image captured by the image-capturing unit 140 described later is acquired as the user information, the image-capturing unit 140 may also function as the user information acquiring unit. The user information acquiring unit 116 may acquire, for example, operation information related to an operation of the display 117 such as turning on/off of the displaying, through a result of the user's operation.

The display 117 is composed of, for example, a liquid crystal panel, an organic EL (electroluminescence) panel, or others. The display 117 may be configured integrally with the information input unit 115, for example, as a touch panel. The display 117 displays, for example, such contents information as images and videos stored in the information storage 125, contents information received by the tuner/demodulator 122, the communication I/F 113, and the mobile communication I/F 131, such contents information as images and videos taken by the registered user, and such contents information as images and videos created by an application program. The display 117 displays also, for example, a user interface (UI), such as an input screen for inputting a password that is necessary for the user to log on to the information processor 100.

The display 117 displays an image, etc., for warning of the viewing limitation of the contents information, etc., as described later.

The viewing time measuring unit 170 measures a viewing time or others during which the registered user views the contents information, etc., displayed on the display 117. For example, when it is determined that a user who intends to use the information processor 100 is the registered user in the controller 114 described later, and then, when the registered user logs on to the information processor 100, the viewing time measuring unit 170 measures a time during which the contents information is displayed on the display 117, as the registered user's viewing time. The viewing time measuring unit 170 defines, for example, a point of time at which the registered user logs on to the information processor 100 as a viewing start time, and measures a time having elapsed from the viewing start time to measure the viewing time.

The viewing time measuring unit 170 may have, for example, a clock function, and may use time information inside the viewing time measuring unit 170. Alternatively, the viewing time measuring unit 170 may acquire the time information from a server 1050 connected to an external network 1040, via the communication I/F 113 and a wireless router shown in FIG. 3. Alternatively, the viewing time measuring unit 170 may acquire the time information from a server 1040 via the mobile communication I/F 131 and a base station 1010. Alternatively, the viewing time measuring unit 170 may acquire the time information from a GPS signal received by the GPS receiver 135. The information processor 100 may acquire the time information from a television signal received by the tuner/demodulator 122. The viewing time measuring unit 170 calculates, for example, a difference from the viewing start time based on the time information acquired through these methods, so that the viewing time is measured.

The viewing time measuring unit 170 may drive a timer inside the information processor 100 at the viewing start time, so that the viewing is measured. Alternatively, the viewing time measuring unit 170 may drive a counter inside the information processor 100 at the viewing start time, and convert the number of counts into the viewing time, so that the viewing time is measured.

The viewing time measuring unit 170 may be composed of hardware or software. For example, the viewing time measuring unit 170 may be monolithically composed with the hardware such as the controller 114, or may be integrated into another program.

The information storage 125 stores the contents information on the information processor 100, the viewing information on the registered user described later, and others. The information storage 125 stores, for example, various pieces of program information such as a basic program for operating the information processor 100 and an application program for allowing the information processor 100 to achieve various functions. The information storage 125 records, for example, various pieces of setting information on the information processor 100, information created by the application program, the contents information displayed on the display 117, the registered user information for identifying the registered user in the information processor 100, the viewing information on the registered user such as the registered user's cumulative viewing time related to the determination made for limiting the viewing of the registered user, and the viewing limit time that is an upper limit of the cumulative viewing time, and others.

The registered user information is, for example, a password, biological information such as a finger print and a finger venous pattern, or face information that is needed when the registered user logs on to the information processor 100. In addition to these pieces of information, the information storage 125 further stores, for example, various contents such as a video/audio stream received from the tuner/demodulator 122, the communication I/F 113, and the mobile communication I/F 131.

The application program may be, for example, previously stored in the information storage 125 before shipment of the information processor 100. Alternatively, the application program stored on a medium such as an optical medium such as a CD (Compact Disc) and a DVD (Digital Versatile Disc) and a semiconductor memory may be installed in the information processor 100 via, for example, a medium connector not shown in the drawings. Alternatively, the application program may be installed after being downloaded from an external network not shown via the communication I/F 113 and the wireless router not shown. Alternatively, the application program may be installed after being downloaded from a distributor via the mobile communication I/F 131 and the base station not shown. Alternatively, the application program may be installed by connecting the information processor 100 via an external equipment connection I/F not shown to a personal computer (PC) that has acquired the application program via the external network, and moving or copying the application program from the PC to the information processor 100. Alternatively, the application program may be achieved by the above-described software, or, for example, hardware having an equivalent function. When the application program is achieved by the hardware, each function is achieved so that the hardware is a main component.

Note that the information storage 125 may be embedded into the information processor 100 or may be configured to be detachable to the information processor 100.

The tuner/demodulator 122, for example, receives television signals transmitted from a broadcasting station 1020 shown in FIG. 3 and demodulates the received television signals. The signal separator 121 separates the television signals, that have been demodulated by the tuner/demodulator 122, into a television signal for each channel, various signals for an electronic program guide (EPG), or others.

In the memory 132, for example, the basic program, the application program, etc., read out of the information storage 125 are loaded. The controller 114 executes the programs loaded in the memory 132, so that various functions included in the respective programs are achieved.

The acceleration sensor 133 measures a size and a direction of acceleration (e.g., gravitational acceleration) acting on the information processor 100. The acceleration sensor 133 outputs measurement values of the measured size and direction of acceleration to the controller 114 as, for example, acceleration information. The acceleration information may be stored in the information storage 125.

The geomagnetic sensor 134 measures a size and a direction of geomagnetism acting on the information processor 100. The geomagnetic sensor 134 may be composed of, for example, a plurality of magnetic sensors, so that the geomagnetism is measured by the plurality of magnetic sensors. The geomagnetic sensor 134 outputs the measured size and direction of the geomagnetism to the controller 114 as, for example, geomagnetic information. The geomagnetic information may be stored in the information storage 125.

The communication I/F 113 is connected to the wireless router 1030 shown in FIG. 3 through, for example, a wireless LAN or others, and is connected to the external network 1040 via the wireless router 1030.

The communication I/F 113, for example, transmits/receives the contents information, the viewing information on the registered user, or others to/from a server 1050 on the external network 1040.

In addition to the communication function with the wireless router 1030 or in place of such a function, the communication I/F 113 may directly communicate with the server 1050 through the wireless LAN such as Wi-Fi (registered trademark) without using the wireless router 1030. Some pieces of the hardware for achieving these communication functions may be mounted on the communication I/F 113, or these communication functions may be achieved by one piece of the hardware. The connection to the external network 1040 through the communication I/F 113 may be put before communication network connection through the mobile communication I/F 131.

The mobile communication I/F 131 is connected to the external network 1040 via the base station 1010 shown in FIG. 3, using a third-generation mobile communication system (which will hereinafter be referred to as "3G") such as a GSM (a registered trade mark) (Global System for Mobile Communications) system, a W-CDMA (Wideband Code Division Multiple Access) system, a CDMA 2000 system, and a UMTS (Universal Mobile Telecommunications System) or a mobile communication network such as an LTE (Long Term Evolution) system. The mobile communication I/F 131 may be composed of one or a plurality of pieces of hardware that support these communication systems.

The communication I/F 113, for example, transmits/receives the contents information, the viewing information on the registered user, or others to/from the server 1050 on the external network 1040.

The information input unit 115 receives an operation on the information processor 100 from the user to acquire the operation information. The information input unit 115 may be, for example, a button for executing various operations in accordance with a state of the information processor 100 or may be composed of one or a plurality of buttons each corresponding to a numeric character, a symbol or others, or may be, for example, a touch panel monolithically composed with the display 117. Alternatively, the information input unit 115 may receive a signal transmitted from a terminal such as a remote controller trough infrared communication, etc., to acquire the operation information from the received signal.

As the operation information, for example, information on an operation of switching on/off a power supply to the information processor 100, information on an operation of switching on/off the display 117 and others are cited.

When the information input unit 115 receives the input of the password, for example, as the user information, the information input unit 115 may function also as the user information acquiring unit.

When the information input unit 115 is the touch panel monolithically composed with the display 117, note that the user can freely move any object (icon), etc., displayed on a screen, by an operation (dragging operation) of moving the object, etc., while the object is being touched with a finger or an operation (flicking operation) of moving the object, etc., while the object is flicked with fingers on the touch panel. The user also can activate the object, etc., or switch the screen to another screen by performing an operation (tapping operation) of tapping the object, etc., with a finger once or an operation (double-tapping operation) of the same twice.

The GPS receiver 135 receives GPS signals transmitted from a plurality of satellites, using the GPS (Global Positioning System). The GPS receiver 135, for example, outputs the received GPS signals to the controller 114. The received GPS signals may be stored in the information storage 125.

The gyrosensor 136 measures an angular velocity of the information processor 100, the angular velocity being generated when the user moves the information processor 100. The gyrosensor 136 outputs, for example, the measured angular velocity to the controller 114 as, for example, angular velocity information. The angular velocity information may be stored in the information storage 125.

The image-capturing unit 140 is composed of, for example, an optical system such as a lens, an image sensor, a signal processing circuit, and others. Controls made by the image-capturing unit 140 such as exposure control, focus control, control of the number of pixels (e.g., resolution) of an acquired image, compression control, and control on captured image storage are carried out in, for example, the controller 114. These controls are carried out in accordance with, for example, a program for camera control. Specifically, the program for camera control stored in the information storage 125 is loaded in the memory 132, and the loaded program is executed by the controller 114, so that these controls are carried out. As shown in FIG. 2, the image-capturing unit 140 may be provided on, for example, the user side (the display 117 side) of the information processor 100 or the opposite side of the user side (the opposite side of the display 117 side) not shown. Further, the image-capturing unit 140 may be provided on both of these sides.

As shown in FIG. 1, the switch input unit 150 is connected to one or a plurality of buttons 151. The switch input unit 150 receives input of the switch information from the button 151, and outputs the received switch information to the controller 114. Based on the switch information, the controller 114 carries out controls for switching on/off of the information processor 100, each of start/stop operations of the application program, and adjustment of an audio volume using two buttons (turning up and down of the audio volume).

To the audio input/output unit 160, for example, the microphone 161 serving as an audio input unit and the speaker 162 serving as an audio output unit are connected as shown in FIG. 1. The audio input/output unit 160, for example, receives input of audio information on the user through the microphone 161. The audio input/output unit 160, for example, outputs the audio information through the speaker 162. The audio input/output unit 160 adjusts the audio volume based on an operation of the above-described button 151.

The bus 101 is an internal bus connecting components of the information processor 100 to one another. The components input and output various pieces of information through the bus 101. The components may be directly connected to one another without using the bus 101. For example, when a large volume of information is handled, the information may be directly input and output between the input side and the output side. In this manner, a load applied to the bus 101 is reduced.

The controller 114 controls each of the components making up the information processor 100. For example, the controller 114 executes various programs based on the operation information from the user, the operation information being acquired by the information input unit 115, or the switch information acquired by the switch input unit 150, to control such components as the signal separator 121, the display 117, and the communication I/F 113.

The controller 114, for example, acquires various pieces of information such as the contents information and the viewing information on the registered user, from the connected server 1050 on the external network 1040 through the communication I/F 113 and the wireless router 1030. The controller 114, for example, acquires various pieces of information such as the contents information and the viewing information on the registered user, from the connected server 1050 on the external network 1040 through the mobile communication I/F 131 and the base station 1010.

The controller 114 carries out the switching on/off of the power supply to the information processor 100, the switching on/off of the display 117, the audio volume adjustment, and others, based on, for example, the operation information and the switch information. When the operation information, the switch information, etc., is not input for, for example, a certain period of time or longer, the controller 114 may switches the display 117 off.

The controller 114 calculates acceleration (e.g., gravitational acceleration) acting on the information processor 100, based on the acceleration information output from the acceleration sensor 133. Based on the calculated acceleration, the controller 114 determines which part of the information processor 100 is on the upper side, that is, detects an orientation of the information processor 100. The controller 114 displays the screen so that, for example, an upper side of the screen displayed on the display 117 matches the upper side measured by the acceleration sensor 133. In this manner, the controller 114 displays the screen in accordance with how to hold the information processor 100 by the user. The controller 114 calculates position information on the information processor 100, based on the GPS signal output from the GPS receiver 135. The controller 114 detects a motion of the information processor 100, based on the angular velocity information output from the gyrosensor 136.

The controller 114 identifies the user when, for example, the display 117 is switched on. Specifically, the controller 114 determines whether the user who intends to use the information processor 100 is the previously-registered user or not. The controller 114 determines whether the user is the registered user or not by, for example, comparing registered user information on the registered user, such as a user ID, a code, a password, biological information, and face information, the registered user information being previously stored in the information storage 125, with the user information acquired by the user information acquiring unit 116.

When the user is the registered user, the controller 114 compares a cumulative viewing time that is a cumulative total of viewing times cumulated within a certain period of time with a viewing limit time that is a previously-set upper limit of the cumulative viewing time. The certain period of time is a period in which the cumulative viewing time is calculated, and the cumulative viewing time is reset when the predetermined time has elapsed. A reset time at which the cumulative viewing time is reset may be set to be, for example, 3:00 AM, and 24 hours from 3:00 AM to 3:00 AM on a next day may be set to a predetermined time. The reset time may be set to other time, the predetermined time may be shorter or longer than 24 hours. These reset time and certain time may be set on the information processor 100 to default values or may be set freely by the user.

When the cumulative viewing time is equal to or longer than the viewing limit time, the controller 114 gives a warning to the registered user. For example, the controller 114 causes the display 117 to display a warning screen showing a warning to the registered user whose cumulative viewing time exceeds the viewing limit time. Alternatively, the controller 114 causes the speaker 162 to emit a warning sound.

The wireless router 1030 has a wireless LAN function such as Wi-Fi, and is connected to the external network 1040 shown in FIG. 3 through a communication line. The wireless router 1030 is connected also to the information processor 100 and to an external network 1040. Note that the Wi-Fi is standards for a wireless LAN (Local Area Network) defined by IEEE (Institute of Electrical and Electronics Engineers) standards "IEEE 802.11a/IEEE 802.11b".

The wireless router 1030 has two interfaces on a LAN side and a WAN (Wide Area Network) side, and different IP addresses are assigned to these interfaces, respectively. Specifically, to the interface on the WAN side, a global IP address identifiable on the Internet is assigned. To the interface o the LAN side, a private IP address usable in a closed network is assigned. In addition, the wireless router 1030 has a firewall function of limiting access from the external network 1040 and an NAPT (Network Address Port Translation) function of transforming the private address into the global address or the global address into the private address.

The information processor 100 is capable of transmitting and receiving various pieces of information and contents to and from the server 1050 connected to the external network 1040, via the communication I/F 113 and the wireless router 1030 or via the mobile communication I/F 131 and the base station 1010.

Next, a method of recording the viewing information on the registered user in the information processor 100 will be described. In the present embodiment, a case of an assumption in which one user registered as an identified individual in the information processor 100 is the user will be described. In the following description, note that various functions may be achieved by hardware or by a process in which each application program is loaded into the memory 132 and is executed by the controller 114.

Figure 4:
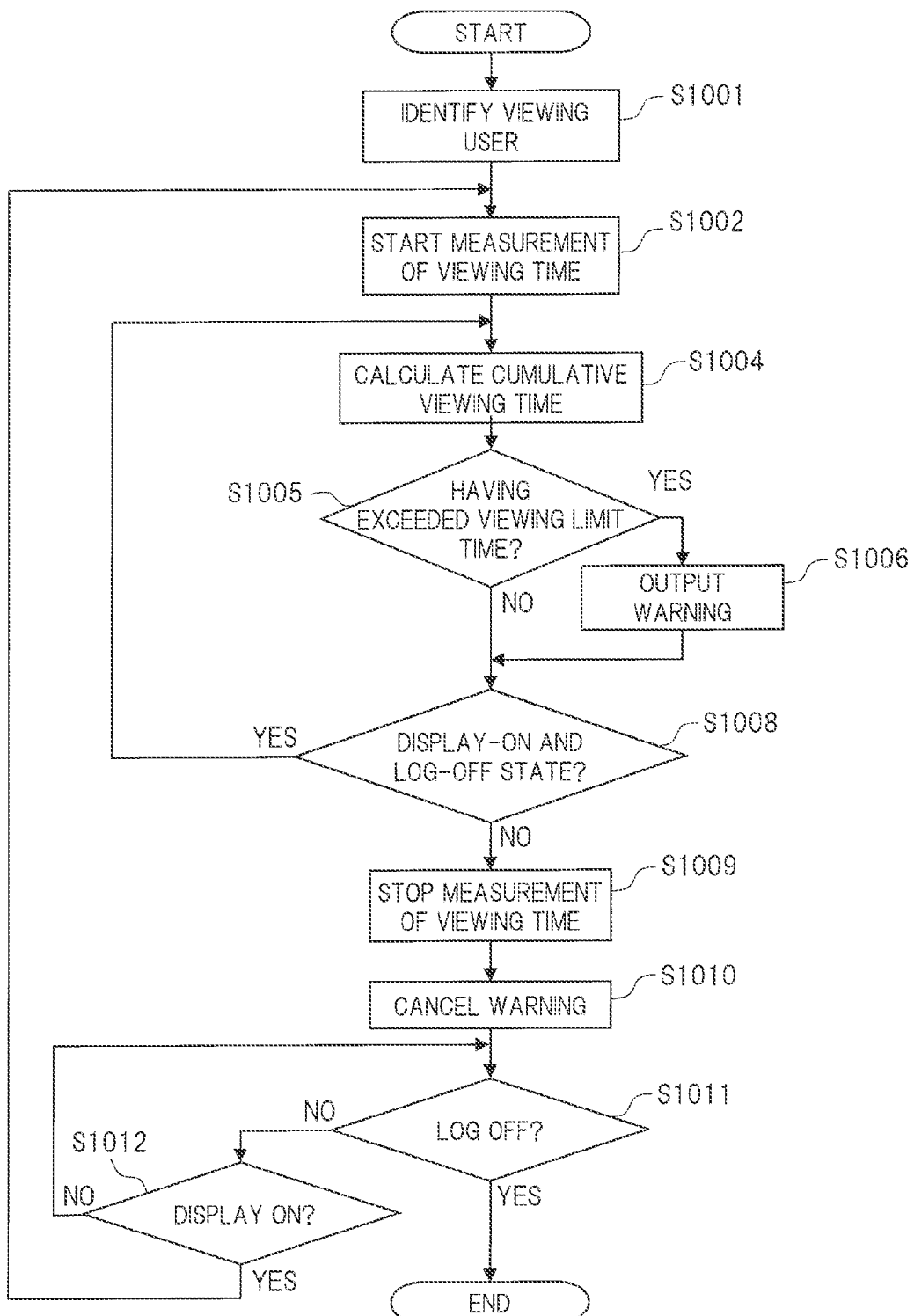
FIG. 4 is a diagram showing an example of a flowchart related to a method of recording viewing information according to the first embodiment of the present invention.
Figure 5:
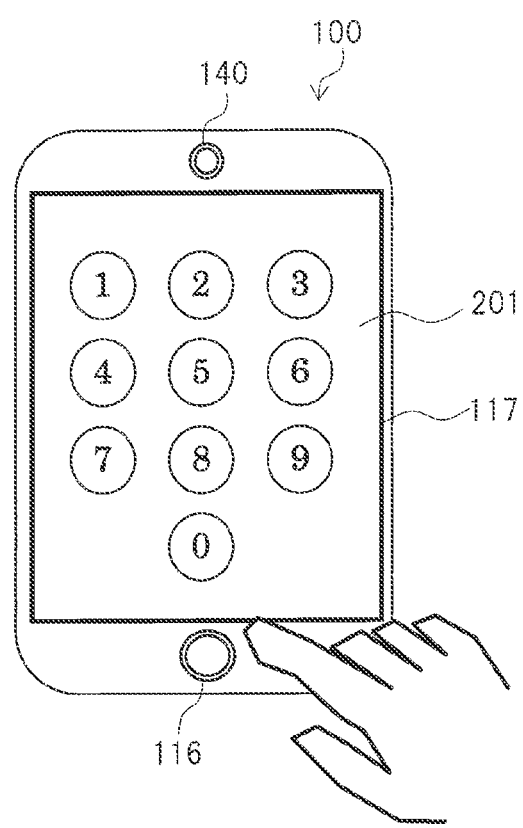
FIG. 5 is a diagram showing an example of a UI image displayed at user authentication according to the first embodiment of the present invention.

FIG. 4 is a diagram showing an example of a flowchart related to a method of recording the viewing information according to the first embodiment of the present invention. FIG. 5 is a diagram showing an example of a UI image displayed at user authentication according to the first embodiment of the present invention.

At step S1001, a user who intends to use the information processor 100 is identified. In other words, step S1001 is a user authentication step at which it is determined whether or not the user who intends to use the information processor 100 is the registered user who has been previously registered as a user of the information processor 100.

Note that the registered user information on the registered user is stored in the information storage 125 of the information processor 100 or in the server 1050 on the network 1040 so as to be associated with the terminal information on the information processor 100, through a registration operation previously carried out by a user who wants to be registered. For example, the viewing information on the registered user such as the viewing limit time and the reset time may be previously stored in the information storage 125 by an administrative user or by the registered user himself/herself, or may be stored in the server 1050 so as to be associated with the terminal information on the information processor 100.

The administrative user determines whether the registered user has authority for setting the viewing information. For example, based on the determination made by the administrative user, it is determined whether only the administrative user is allowed to set the viewing information or the registered user is also allowed to set the viewing information. The administrative user may be the registered user or may be a user different from the registered user.

Based on the user information and the registered user information for identifying the registered user, the controller 114 determines whether a user is the registered user. When the information processor 100 detects a press to the button 151 of the switch input unit 150, the information input unit 115, the user information acquiring unit 116, or others, the controller 114 switches the display 117 on to cause it to display, for example, the UI image requesting the input of the user information. For example, the controller 114 causes the display 117 to display a password input screen 201 requesting input of the password as shown in FIG. 5. On the password input screen 201, for example, a (on-screen) software keyboard handling each number of "0" to "9" as shown in FIG. 5 may be displayed, or a software keyboard having combination of numbers and symbols may be displayed.

Then, as the user information, the information processor 100 acquires the password input by the user. The acquired password is output to the controller 114. The controller 114 verifies matching between the acquired password and a password registered previously as the registered user information, and determines whether the user who intends to use the information processor 100 is the registered user. In other words, when the input password matches the registered password, the controller 114 determines that the user is the registered user. In this case, it is determined that the user has touched the numbers on the displayed keyboard in the same order as an order of the registered password. Then, the registered user is able to log on to the information processor 100, and, for example, an initial screen to be displayed after the log-on to the information processor 100, the contents information, or others is displayed on the display 117.

On the other hand, when the input password does not match the registered password, the controller 114 determines that the user is not the registered user. In this case, it is determined that the user has touched the numbers on the displayed keyboard in a different order from the order of the registered password. The user is not able to log on to the information processor 100. However, on the display 117 in this case, an image, etc., notifying that the input password is different from the registered password may be displayed, or the password input screen 201 encouraging the user to re-enter the password may be displayed.

As described above, note that the controller 114 may use the registered user information stored in the information storage 125 or the registered user information stored in, for example, the server 1050. In the above-described example, the case of the password made up of the numbers and the symbols has been described. However, in addition to this, selection of a letter or an image, track of the touch, and or others may also be used as the user information.

In the above-described example, the case of the display 117 that is the touch panel composed together with the information input unit 115 has been described. However, in addition to this, the information input unit 115 may be made up of buttons in accordance with the above-described software keyboard and the password may be input through these buttons.

As the registered user information, for example, biological information such as the finger print and the finger venous pattern may be used. In such a case, for example, the user inputs the user information by, for example, causing the user information acquiring unit 116 having a biosensor to read the biological information such as the finger print and the finger venous pattern. The user information acquiring unit 116 acquires the biological information as the user information, and outputs the acquired biological information to the controller 114. The controller 114 determines whether the user is the registered user or not by verifying matching between the acquired biological information and the biological information registered as the registered user information.

Figure 6:
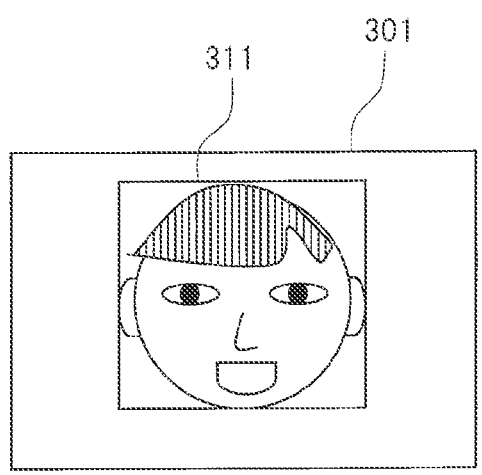
FIG. 6 is a diagram showing an example of a user image created by an image-capturing unit.

Further, for example, the face information may also be used as the registered user information. In such a case, an image of the user is captured by the image-capturing unit 140, and the face information extracted from the user image is input as the user information. FIG. 6 is a diagram showing an example of the user image created by the image-capturing unit. The image-capturing unit 140 captures the user image, and creates, for example, a user image 301 as shown in FIG. 6. The image-capturing unit 140 extracts face information 311 from the user image 301, and outputs the extracted face information 311 to the controller 114, as the face information on the user. Alternatively, the image-capturing unit 140 may output the user image 301 to the controller 114, and then, the controller 114 may extract the face information 311 from the user image 301. When the information processor 100 detects a press to the button 151, etc., of the switch input unit 150, the image-capturing unit 140 may automatically start to capture the user image, and carry out the log-on process without the user's operation.

The controller 114 determines whether the user is the registered user by verifying matching the acquired face information and the face information on the registered user.

The methods of identifying the user in the information processor 100 have been described. It is only required for the information processor 100 to identify the user by any one of the above-described methods, and it is not always required to carry out all of these methods. When the user who intends to use the information processor 100 is determined to be the registered user as described above, the process flow proceeds to step S1002.

At step S1002, the viewing time measuring unit 170 starts to measure the viewing time during which the registered user views the contents information, etc., displayed on the display 117. For example, the controller 114 outputs a viewing time measurement start signal encouraging the start of the measurement of the registered user's viewing time, to the viewing time measuring unit 170, and the viewing time measuring unit 170 starts to measure the registered user's viewing time based on the input viewing time measurement start signal.

The controller 114 may determine, for example, a time at which the registered user has logged on to the information processor 100 and started viewing contents information to be the viewing start time or may determine a time at which the display 117 has been switched on to be the viewing start time. The viewing time measuring unit 170 may measure an elapsed time by calculating a difference from the viewing start time or may measure a time elapsed from the viewing start time, using a timer, to measure the viewing time. The viewing time measuring unit 170, for example, outputs the measured viewing time to the controller 114. The viewing time measuring unit 170 may output information on the measured viewing time at a predetermined cycle, or output the information in response to, for example, a request from the controller 114. Alternatively, the viewing time measuring unit 170 may output the viewing information on the viewing time to the information storage 125 to record the viewing information on the viewing time in the information storage 125. The viewing information on the viewing time may be transmitted to the server 1050 on the external network 1040, via the communication I/F 113 or the mobile communication I/F 131 to be recorded in the server 1050 as the viewing information. When the measurement of the registered user's viewing time is started in this manner, the process flow proceeds to step S1004. Note that the viewing time measuring unit 170 consecutively measure the registered user's viewing time while steps S1004 to S1008 are executed until the measurement is topped at step S1009 described later.

At step S1004, the controller 114 calculates a cumulative viewing time that is a cumulative total of the viewing times cumulated within a predetermined period of time. Specifically, when the registered user has viewed the information several times within the predetermined period of time, the controller 114 calculate the cumulative viewing time up to current viewing by, for example, summing the viewing time of the current viewing and the cumulative viewing time that is a sum of viewing times of respective viewings up to previous viewing except for the current viewing. Alternatively, the controller 114 may calculate the cumulative viewing time by summing viewing times of respective viewings up to the current viewing. The viewing information on the calculated cumulative viewing time is recorded in, for example, the information storage 125 or the server 1050.

When the registered user's cumulative viewing time is calculated in this manner, the process flow proceeds to step S1005. Note that the controller 114 consecutively calculates the registered user's cumulative viewing time while the steps S1002 to S1008 are executed until stopping the measurement at step S1009 described later.

At step S1005, the controller 114 compares the cumulative viewing time calculated at step S1004 with the viewing limit time. When the controller 114 determines (NO) that the cumulative viewing time is shorter than the viewing limit time, the process flow proceeds to step S1008.

Figure 7:
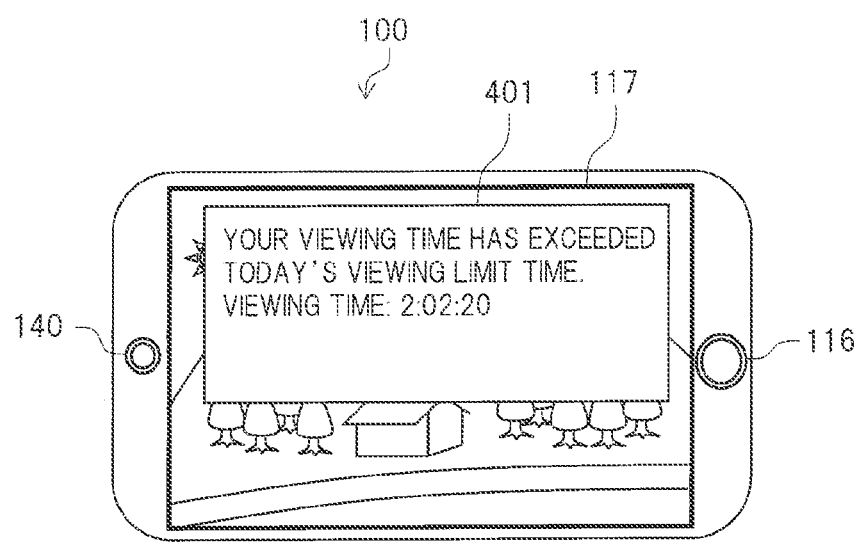
FIG. 7 is a diagram showing an example of a warning image to a registered user according to the first embodiment of the present invention.

On the other hand, when the controller 114 determines (YES) that the cumulative viewing time is equal to or longer than the viewing limit time, the process flow proceeds to step S1006. At step S1006, the controller 114 gives a warning to the registered user. FIG. 7 is a diagram showing an example of the warning image to the registered user according to the first embodiment of the present invention. In FIG. 7, for example, a warning notification image 401 warning the registered user of the excess of the viewing limit time is displayed so as to overlap the contents information displayed on the display 117. Information on such a notification image 401 is stored in, for example, the information storage 125 or the server 1050.

For example, when a purpose of the warning is the notification of the excess of the viewing limit time, the warning image may be displayed at a position and with size not affecting the viewing so much. When it is desirable to, for example, stop the viewing of the registered user, the notification image 401 may be displayed in, for example, front of the contents information as shown in FIG. 7. A size of the notification image may be suitably changed in accordance with time exceeding from the viewing limit time. Specifically, a small notification image may be displayed right after the cumulative viewing time reaches the viewing limit time, but a larger notification image may be displayed as the excess time is larger.

In such a case, for example, as the warning image 401 as shown in FIG. 7, the controller 114 may display the current cumulative viewing time up to the current viewing or the viewing limit time together with the viewing time. The warning to the registered user may be, for example, not the display of the warning image 401 but emission of warning sound from the speaker 162, switching off of the display of the contents information, or others.

Figure 8:
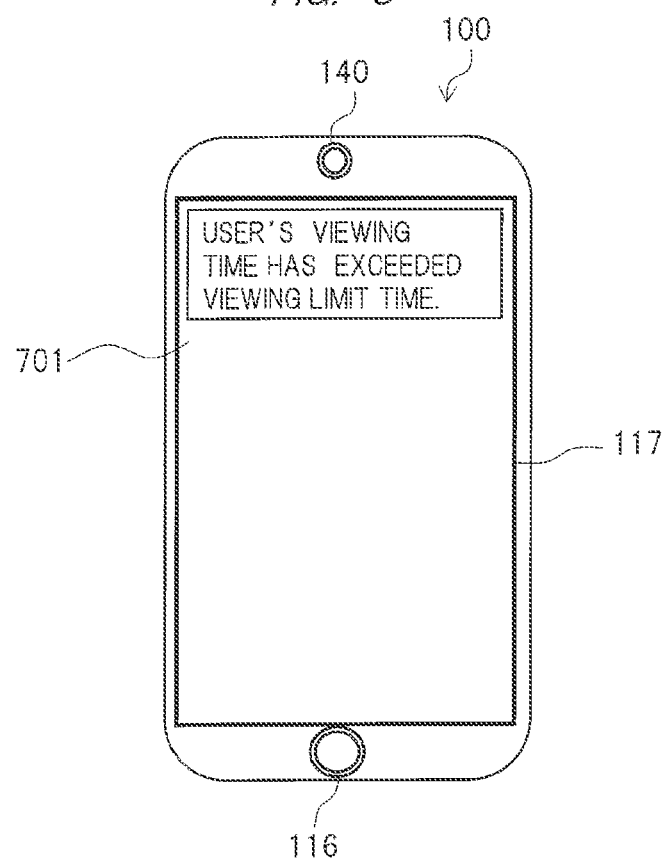
FIG. 8 is a diagram showing an example of a notification image to an administrative user according to the first embodiment of the present invention.

The controller 114 may notify the administrative user of a fact that the registered user's cumulative viewing time has exceeded the viewing limit time. FIG. 8 is a diagram showing an example of a notification image to the administrative user according to the first embodiment of the present invention. For example, the controller 114 transmits viewing limit time excess information indicating that the registered user's cumulative viewing time has exceeded the viewing limit time, to an information processor used by the administrative user. Based on the received viewing limit time excess information, the administrative user's information processor displays, for example, a notification image 701 notifying that the viewing time of the registered user has exceeded the viewing limit time as shown in FIG. 8. Then, the process flow proceeds to step S1008.

At step S1008, it is determined whether or not the measurement of the registered user's viewing time is continued. Specifically, when the controller 114 determines (YES) that the registered user has logged on to the information processor 100, and besides, that the information is being displayed on the display 117, the process flow returns to step S1004. The, the controller 114 executes the above-described steps S1004 to S1008 again to continue the measurement of the registered user's viewing time.

On the other hand, when the controller 114 determines (NO) that the registered user has logged off from the information processor 100 or that the information is not being displayed on the display 117, the process flow proceeds to step S1009.

At step S1009, the viewing time measuring unit 170 stops the measurement of the registered user's viewing time. For example, to the viewing time measuring unit 170, the controller 114 outputs a viewing time measurement stop signal for stopping the measurement of the registered user's viewing time. Based on the input viewing time measurement stop signal, the viewing time measuring unit 170 stops the measurement of the registered user's viewing time. At this time, the viewing time measuring unit 170 may output the viewing information on the measured viewing time to the information storage 125 so that the viewing time is recorded in the information storage 125. Consequently, the controller 114 stops the calculation of the registered user's cumulative viewing time. The process flow then proceeds to step S1010.

At step S1010, the warning to the registered user is canceled. For example, when the warning image 401 is displayed on the display 117 at step S1006, the controller 114 erases the warning image 401, so that the warning to the registered user is canceled. Alternatively, when the warning sound is emitted, the controller 114 cancels the warning by, for example, stopping the warning sound. When the warning to the registered user is canceled in this manner, the process flow proceeds to step S1011.

At step S1011, the controller 114 determines whether the registered user has logged off from the information processor 100. When the controller 114 determines (YES) that the registered user has logged off from the information processor 100, a series of steps for the method of recoding the viewing information on the registered user are ended.

On the other hand, when the controller 114 determines (NO) that the registered user has not logged off from the information processor 100, the process flow proceeds to step S1012.

At step S1012, the controller 114 determines whether the information is being displayed on the display 117. When the controller 114 determines (YES) that the information is being displayed on the display 117, the process flow proceeds to step S1002. The, the controller 114 starts the measurement of the registered user's viewing time again.

On the other hand, when the controller 114 determines (NO) that the information is not being displayed on the display 117, the process flow proceeds to step S1011, so that it is determined again whether the registered user has logged off from the information processor 100.

By the execution of these steps S1001 to S1012, the viewing information on the registered user is recorded in the information processor 100. Note that the viewing information to be recorded is not limited to the above-described viewing information. For example, authentication information, detailed logs on equipment use, etc., may be recorded as the viewing information.

According to the present embodiment, the viewing time measuring unit 170 measures the registered user's viewing time, and the controller 114 calculates the registered user's cumulative viewing time cumulated within the predetermined period of time, compares the cumulative viewing time with the viewing limit time that is the upper limit of the cumulative viewing time, and gives the warning to the registered user when the cumulative viewing time is equal to or longer than the viewing limit time.

According to this configuration, by the warning notified by the information processor 100, the registered user can recognize that the cumulative viewing time cumulated within the predetermined period of time has reached the viewing limit time. Therefore, even when the cumulative viewing time has exceeded the viewing limit time during the viewing of the information, the viewing by the registered user can be suppressed. As a result, the viewing information such as the registered user's cumulative viewing time can be suitably recorded.

According to the present embodiment, the controller 114 gives a warning to the registered user in the form of the warning image 401 displayed on the display 117. According to this configuration, the warning image 401 is displayed together with contents information. The registered user is, therefore, able to quickly stop viewing the contents information. As a result, the registered user's cumulative viewing time can be recorded suitably.

According the present embodiment, the controller 114 gives a warning to the registered user by causing the speaker 162 to emit a warning sound. According to this configuration, the registered user recognizes the warning through the warning sound, and is therefore able to quickly stop viewing the contents information even when looking away from the information processor 100. As a result, the registered user's cumulative viewing time can be recorded suitably.

According the present embodiment, the registered user information and the viewing information on the cumulative viewing time and viewing limit time, etc., are stored in the information storage 125. According to this configuration, the viewing information is recorded in the information processor 100, and therefore, the controller 114 can quickly record the viewing information on the registered user. In addition, it is not required to use the external network 1040, and therefore, the load on the network is reduced.

According to the present embodiment, the password input from the information input unit 115 is acquired as the user information. According to this configuration, the registered user is able to log on to the information processor 100 by a simple method, and therefore, the information processor 100 offering both security and convenience is provided.

According to the present embodiment, the user information acquiring unit 116 has the biosensor and acquires the biological information such as the user's finger print and finger venous pattern, as the user information. According to this configuration, the user information acquiring unit 116 is able to acquire more accurate user information for identifying the user, and therefore, the user authentication can be more accurately carried out. As a result, the information processor 100 with more improved security is provided.

According to the present embodiment, the face information is extracted from the user image created by the image-capturing unit 140, and the information processor 100 acquires the face information as the user information. According to this configuration, the user can acquire the face information by only causing the image-capturing unit 140 to capture the image of the user himself/herself, and therefore, a work load on the user at the time of user authentication is reduced. Further, the face information can be used as the user information, and therefore, the information processor 100 with the improved security can be provided.

According to the present embodiment, when the registered user's cumulative viewing time exceeds the viewing limit time, the information processor used by the administrative user is notified of the excess. According to this configuration, the administrative user can recognize that the registered user is viewing the contents information for longer time than the viewing limit time.

According to the present embodiment, the information processor 100 is provided as a smartphone. According to this configuration, many users have their own smartphones, and therefore, the viewing information on the registered users can be suitably recorded.

Second Embodiment

In the present embodiment, a case in which a plurality of users are registered in the information processor 100 will be described. The information processor 100 according to the present embodiment is, for example, a smartphone, a cellular phone, a tablet terminal, a personal computer, or others.

Note that the registered user information on the plurality of registered users is stored so as to be associated with terminal information on the information processor 100, into the information storage 125 of the information processor 100 or the server 1050 on the network 1040, through the registration operation previously carried out by a user who intends to be registered. Alternatively, for example, by the administrative user or the registered user himself/herself, the viewing information on the registered user such as the viewing limit time and the reset time may be recorded previously in the information storage 125 or may be recorded into the server 1050 so as to be associated with the terminal information on the information processor 100. Alternatively, the administrative user may be one of the registered users or a different user from the registered users.

Here, a method of recording the viewing information on the registered users when the plurality of users are registered will be described with reference to the flowchart of FIG. 4. In the following description, a descriptive content that overlaps a descriptive content of the first embodiment will be omitted in principle.

Figure 9:
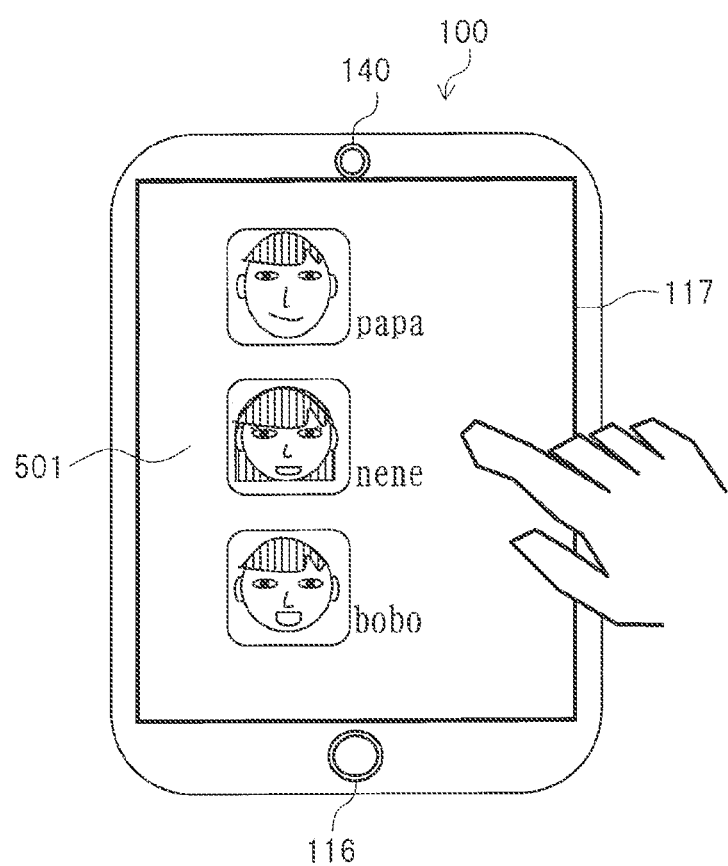
FIG. 9 is a diagram showing an example of an image displayed at user authentication according to a second embodiment of the present invention.
Figure 10:
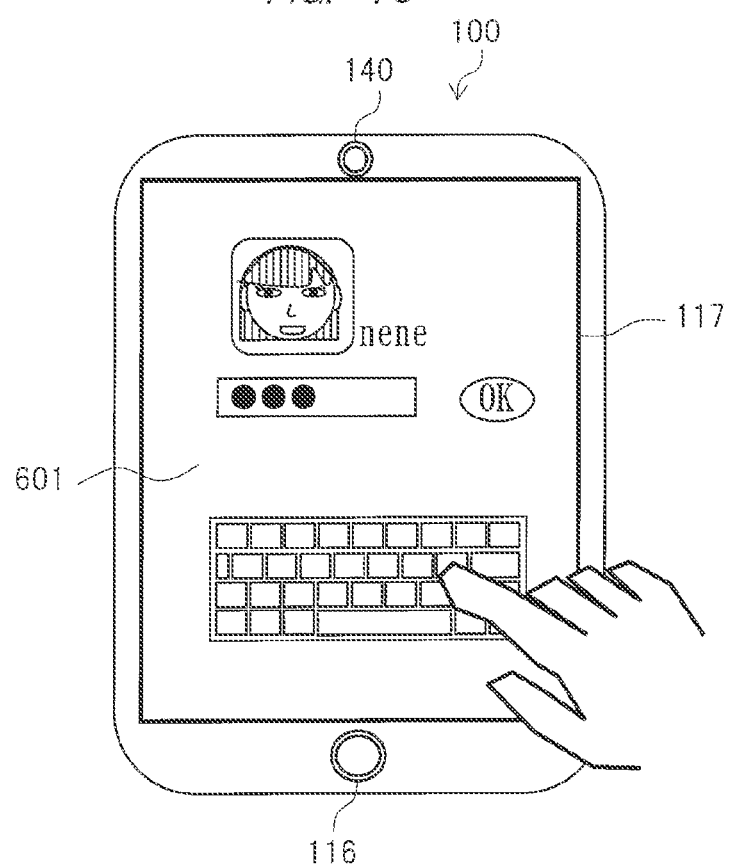
FIG. 10 is a diagram showing an example of an image displayed at user authentication according to the second embodiment of the present invention.

FIGS. 9 and 10 are diagrams each showing an example of an image displayed at the user authentication according to the second embodiment of the present invention. FIG. 11 is a diagram showing an example of a method of recording the viewing information on the registered users according to the second embodiment of the present invention.

At step S1001, it is determined whether the user who intends to use the information processor 100 is one of the plurality of registered users who have been previously registered as the users of the information processor 100. To the user who intends to use the information processor 100, the controller 114 causes the display 117 to display, for example, a user selection screen 501 for selecting the registered user as shown in FIG. 9. On the user selection screen 501, as shown in FIG. 9, for example, a registered user name, an icon with the face information associated with the registered user name, and others, are displayed. When the user taps, for example, an icon associated with the user himself/herself, the registered user associated with the tapped icon is selected. Subsequently, the controller 114 requests the user to input the user information. Specifically, the controller 114 causes the display 117 to display, for example, a password input screen 601 as shown in FIG. 10.

On the password input screen 601, for example, as shown in FIG. 10, the selected registered user name and face information, a software keyboard for the password input, etc., are displayed. When the password is input through the password input screen 601, the information processor 100 acquires the password as the user information. The controller 114 determines whether the user who intends to use the information processor 100 is the selected registered user by verifying matching between the input password and the password of the selected registered user.

At step S1004, the controller 114 calculates the cumulative viewing time of the selected registered user (the registered user who has logged on), which is cumulated within a predetermined period of time. In other words, the controller 114 calculates the cumulative viewing time for each registered user.

In the information storage 125 and the server 1050, the viewing information such as the cumulative viewing time and the viewing limit time is recorded for each of the registered users. Specifically, as shown in FIG. 11, the viewing information such as a user ID, administrator information, the viewing limit time, the reset time, the cumulative viewing time, and the viewing start time is recorded in a table for each of the registered users. The administrator information is information for determining whether the registered user is the administrative user. In FIG. 11, a user with a user ID "001" is the administrative user. In FIG. 11, note that the viewing limit time is different for each of the registered users. Further, the reset time, etc., may also be different for each of the registered users.

At step S1005, the controller 114 compares the cumulative viewing time with the viewing limit time for each registered user. When the controller 114 determines that the cumulative viewing time of the registered user who has logged on to the information processor 100 and viewing the contents information is equal to or longer than the viewing limit time, the process flow proceeds to step S1006. On the other hand, when the controller 114 determines that the cumulative viewing time of the registered user who has logged on is shorter than the viewing limit time, the process flow proceeds to step S1008.

At step S1006, the controller 114 gives the warning to the registered user who has logged on. The controller 114 causes the display 117 to display, for example, the warning image 401 warning that the cumulative viewing time of the registered user who has logged on is equal to or longer than the viewing limit time as shown in FIG. 7. In other words, even if the cumulative viewing time of a different user is equal to or longer than the viewing limit time, when the cumulative viewing time of the registered user who has logged on is shorter than the viewing limit time, the warning image 401 is not displayed. For example, in FIG. 11, the cumulative viewing time of a registered user with a user ID "003" is longer than the viewing limit time. When the registered user with the user ID "003" is using the information processor 100, the warning image 401 is displayed. However, when a different registered user from the user is using the information processor 100, the warning image 401 is not displayed.

According to the present embodiment, the information processor 100 records the viewing information on the plurality of registered users. And, the controller 114 gives the warning only when the cumulative viewing time of the user who has logged on is equal to or longer than the viewing limit time. According to this configuration, only the contents information viewing by the registered user who is a target for the warning is limited, and therefore, a different registered user can use the information processor 100 without the limitation of the contents viewing.

Third Embodiment

In the present embodiment, a case in which the warning is given also when the registered user has consecutively viewed the information for a predetermined period of time will be described. The information processor 100 according to the present embodiment is, for example, a smartphone, a cellular phone, a tablet terminal, a personal computer, or others.

For example, note that the viewing information on the registered user, such as a consecutive viewing limit time that is a previously-set upper limit of the consecutive viewing time, a predetermined break time, the viewing limit time, and the reset time, may be previously recorded into the information storage 125 or the server 1050 so as to be associated with the terminal information on the information processor 100 by the administrative user or the registered user himself/herself. The administrative user may be one of the registered users or a different user from the registered users.

Here, a method of recording the viewing information on the registered users when the plurality of users are registered will be described with reference to the flowchart of FIG. 4. In the following description, note that a descriptive content that overlaps a descriptive content of the first embodiment will be omitted in principle.

Figure 13:
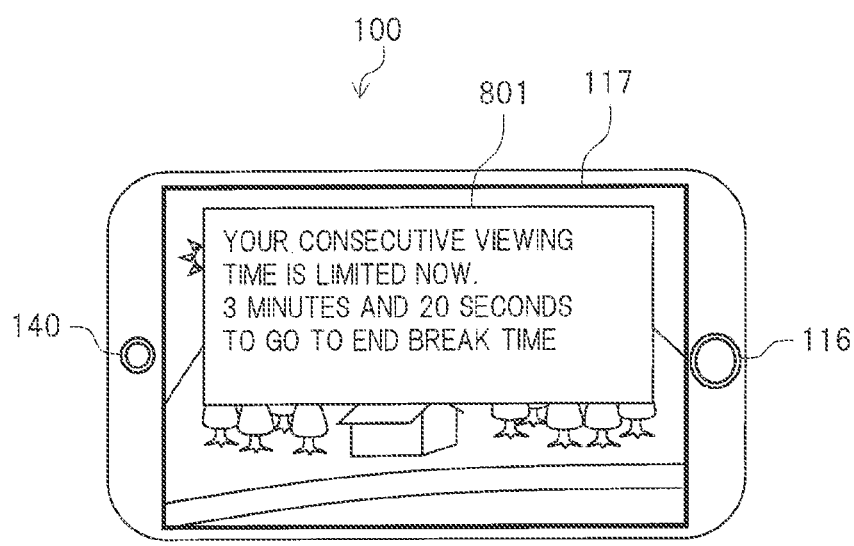
FIG. 13 is a diagram showing an example of a warning image to a registered user according to the third embodiment of the present invention.

FIG. 12 is a diagram showing an example of the method of recording the viewing information on the registered users according to the third embodiment of the present invention. FIG. 13 is a diagram showing an example of the warning image to the registered user according to the third embodiment of the present invention.

At step S1002, the viewing time measuring unit 170 starts the measurement of the viewing time during which the registered user has viewed the contents information, etc., displayed on the display 117. This viewing time measured by the viewing time measuring unit 170 is also the consecutive viewing time during which the registered user has consecutively viewed the contents information. Therefore, the viewing time measuring unit 170 starts the measurement of the consecutive viewing time by staring the measurement of the viewing time.

The viewing time measuring unit 170, for example, outputs the measured consecutive viewing time to the controller 114. The viewing time measuring unit 170 may output the information on the measured consecutive viewing time at, for example, a predetermined cycle, or output it in accordance with, for example, a request from the controller 114. Alternatively, the viewing time measuring unit 170 may output viewing information on the consecutive viewing time to the information storage 125 so that the viewing information on the consecutive viewing time is stored in the information storage 125. Alternatively, the viewing information on the consecutive viewing time may be transmitted to the server 1050 on the external network 1040 via the communication I/F 113 or the mobile communication I/F 131 and be recorded in the server 1050.

Into the information storage 125 and the server 1050, the viewing information on the consecutive viewing and the viewing information on the cumulative viewing are recorded for each registered user. Specifically, the viewing information on the cumulative viewing is recorded into, for example, a table shown in FIG. 11, and the viewing information on the consecutive viewing is recorded into, for example, a table shown in FIG. 12. In FIG. 12, viewing information such as the user ID, the administrator information, the viewing limit rime, the consecutive viewing limit time, a break time, and a break end time, is recorded for each registered user. Note that the consecutive viewing time may be calculated from, for example, the viewing start time recorded into the table of FIG. 11, or the consecutive viewing time (the viewing time) may be recorded into the tables of FIGS. 11 and 12.

At step S1005, the controller 114 determines each of the cumulative viewing time and the consecutive viewing time. Specifically, when the controller 114 determines (NO) that the cumulative viewing time is shorter than the viewing limit time, and besides, that the consecutive viewing time is shorter than the consecutive viewing limit time, the process flow proceeds to step S1008.

When the controller 114 determines otherwise, the process flow proceeds to step S1006. At step S1006, the controller 114 give the warning to the registered user. Firstly, when the cumulative viewing time is equal to or longer than the viewing limit time, and besides, when the consecutive viewing time is shorter than the consecutive viewing limit time, the controller 114 carries out the same controls as those in the above-described first and second embodiments. Secondly, when the cumulative viewing time is equal to or longer than the viewing limit time, and besides, when the consecutive viewing time is equal to or longer than the consecutive viewing limit time, the controller 114 also carries out the same controls as those in the above-described first and second embodiments.

Thirdly, when the cumulative viewing time is shorter than the viewing limit time, and besides, when the consecutive viewing time is equal to or longer than the consecutive viewing limit time, the controller 114 warns the registered user who has logged on that the user should take a predetermined break time. The controller 114 outputs the break end time of the registered user who has been warned, to the information storage 125, and the information storage 125 records viewing information on the input break end time into the table. The viewing time measuring unit 170 starts the measurement of the break time of the registered user who has been warned. For example, the controller 114 outputs a break-time measurement start signal for starting the measurement of the break time of the registered user, to the viewing time measuring unit 170. Based on the input break-time measurement start signal, the viewing time measuring unit 170 starts the measurement of the break time of the registered user.

The viewing time measuring unit 170 measures the break time in an assumption that, for example, a time at which the consecutive viewing time of the registered user reaches the consecutive viewing limit time is set as the break start time. The viewing time measuring unit 170 may output information on the measured break time at, for example, a predetermined cycle, or output it in accordance with, for example, a request from the controller 114. Alternatively, the viewing time measuring unit 170 may output the viewing information on the measured break time or others to the information storage 125 so that the viewing information on the break time is recorded into the information storage 125. Alternatively, the viewing information on the break time of the registered user or others may be transmitted to the server 1050 on the external network 1040, via the communication I/F 113 or the mobile communication I/F 131 and be recorded into the server 1050.

For example, the controller 114 causes the display 117 to display a warning image 801 warning the registered user that the user should take the break time as shown in FIG. 13. At this time, the controller 114 may cause the display 117 to display, for example, a remaining break time in the warning image 801.

The warning image 801 is displayed when the consecutive viewing time of the registered user who has logged on is equal to or longer than the consecutive viewing limit time. In other words, even if the consecutive viewing time of the different registered user is equal to or longer than the consecutive viewing limit time, when the cumulative viewing time of the registered user who has logged on is shorter than the viewing limit time, the warning image 801 is not displayed.

In an example of combination of FIGS. 11 and 12, a registered user with a user ID "002" has a cumulative viewing time not exceeding a viewing limit time. Therefore, when the consecutive viewing time of the registered user with the user ID "002" exceeds the consecutive viewing limit time, the warning image 801 shown in FIG. 13 is displayed. On the other hand, the registered user with the user ID "003" has a cumulative viewing time exceeding a viewing limit time. Therefore, even when the consecutive viewing time of the registered user with the user ID "003" exceeds the consecutive viewing limit time, the warning image 801 shown in FIG. 13 is not displayed.

When the predetermined break time has elapsed, the controller 114 erases the warning image 801. The controller 114 outputs a break time measurement stop signal for stopping the measurement of the break time to the viewing time measuring unit 170. Based on the input break time measurement stop signal, the viewing time measuring unit 170 stops the measurement of the break time of the registered user.

The controller 114 resets the consecutive viewing time (viewing time). Specifically, the controller 114 outputs a consecutive viewing time reset signal for resetting the consecutive viewing time to the viewing time measuring unit 170. Based on the input consecutive viewing time reset signal, the viewing time measuring unit 170 resets the measured consecutive viewing time.

At step S1009, the viewing time measuring unit 170 stops the measurement of the registered user's consecutive viewing time (viewing time). When the break time has been measured, the viewing time measuring unit 170 also stops the measurement of the break time.

At step S1010, when the registered user is taking the break time, the controller 114 erases the warning image 801.

According to the present embodiment, when the registered user's cumulative viewing time is shorter than the viewing limit time and the registered user's consecutive viewing time is equal to or longer than the consecutive viewing limit time, the controller 114 warns the registered user that the user should take the predetermined break time.

According to this configuration, the viewing of the contents information can be limited for the registered user also on the basis of the consecutive viewing time. As a result, the viewing information on the registered user can be suitably recorded.

According to the present embodiment, when a plurality of users are registered in the information processor 100, only the registered user who has logged on to the information processor 100 is warned that the user should take the predetermined break time. According to this configuration, only the viewing by the registered user who is using the information processor 100 is limited. As a result, the viewing times of the plurality of registered users are suitably recorded.

According to the present embodiment, the information processor 100 records the viewing information on the plurality of users. And, the controller 114 gives the warning only when the consecutive viewing time of the registered user who has logged on is equal to or longer than the consecutive viewing limit time. According to this configuration, only the contents information viewing by the registered user who is the target of the warning is limited. Therefore, the different registered user can use the information processor 100 without the limitation of the contents viewing.

Fourth Embodiment

In the present embodiment, a method of recording the viewing information when the user views the contents of the information processor 100 without carrying out the log-on operation will be described. The present embodiment is applicable to not only a case of individual usage by the user but also a case of simultaneous viewing by the plurality of users. Therefore, the information processor 100 according to the present embodiment is, for example, a smartphone, a cellular phone, a tablet terminal, a personal computer, a television, or others.

Figure 14:
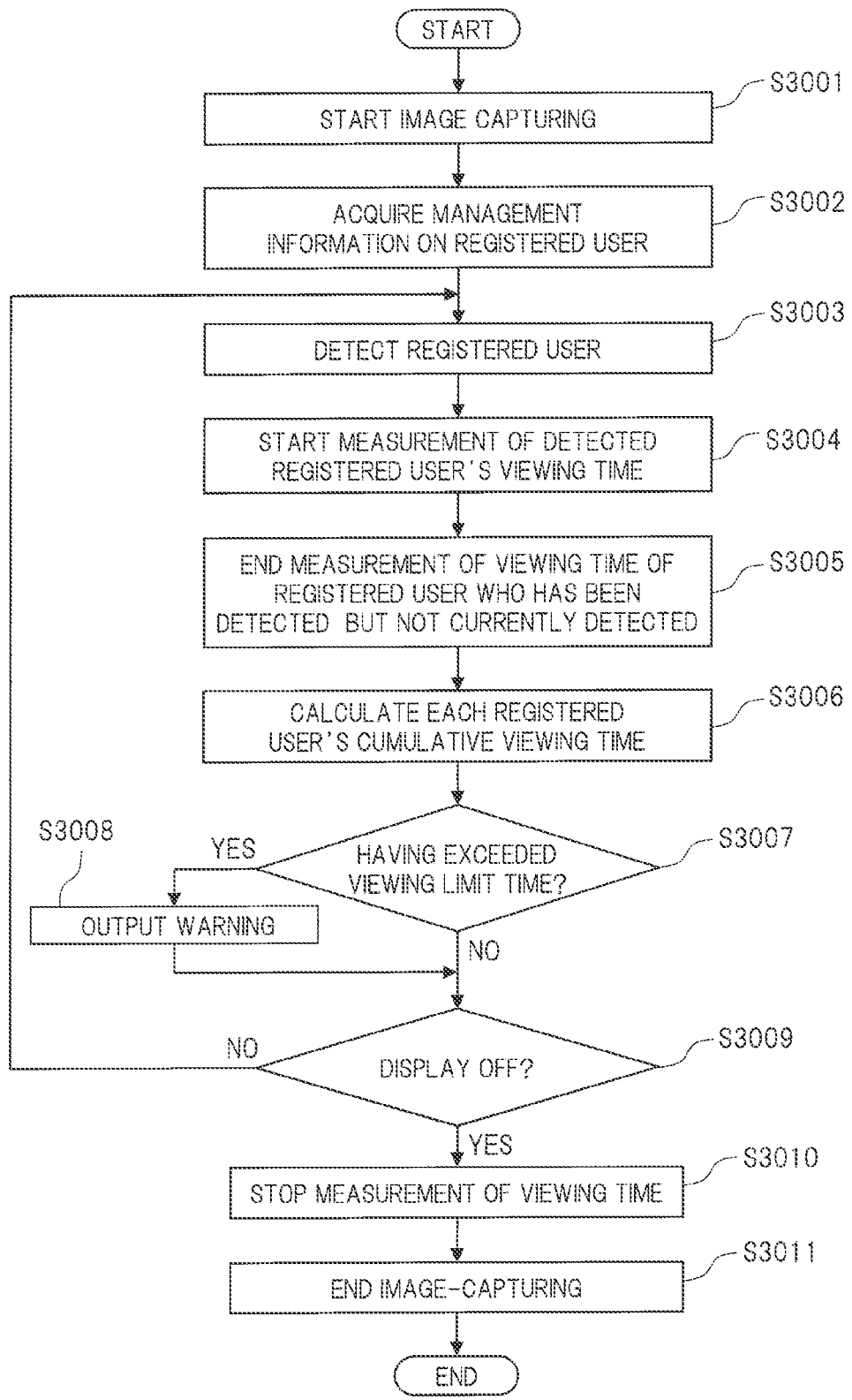
FIG. 14 is a diagram showing an example of a flowchart related to a method of recording viewing information according to a fourth embodiment of the present invention.
Figure 15:
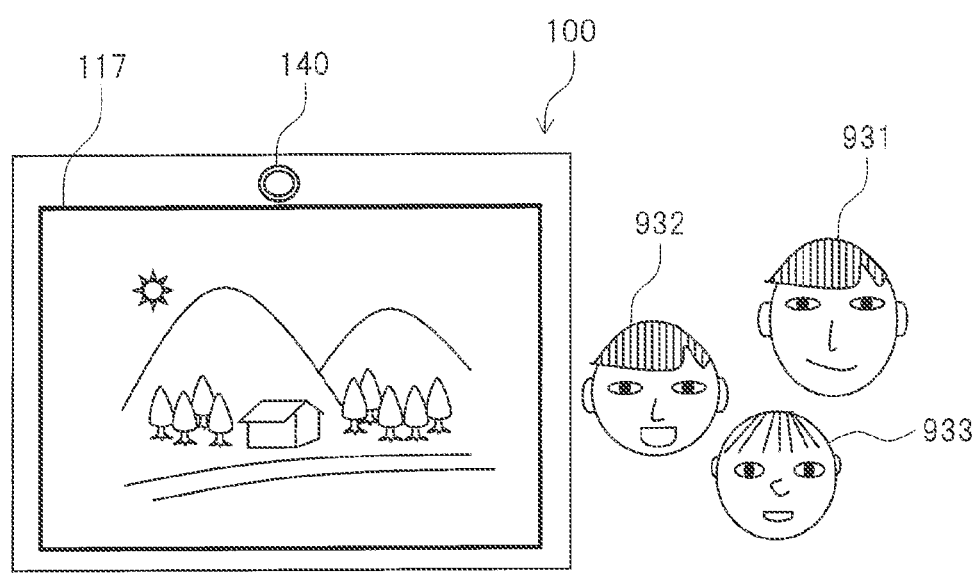
FIG. 15 is a diagram showing an example of a viewing state in which a plurality of users are viewing contents of the information processor.
Figure 16:
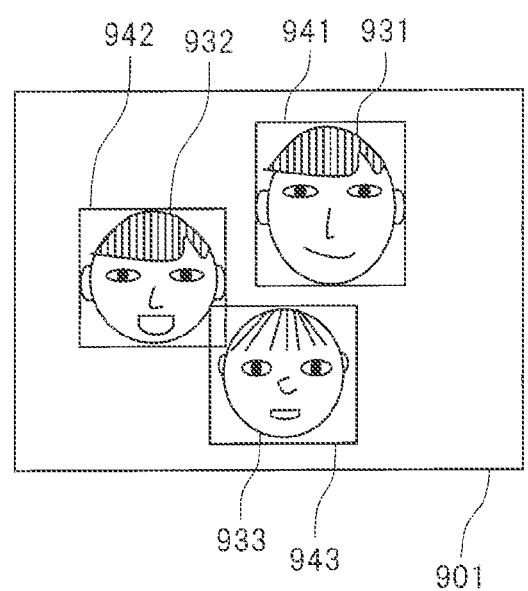
FIG. 16 is a diagram showing an example of acquired user's face information.

FIG. 14 is a diagram showing an example of a flowchart related to the method of recording the viewing information according to the fourth embodiment of the present invention. FIG. 15 is a diagram showing an example of a situation in which the plurality of users are viewing contents of the information processor. FIG. 16 is a diagram showing an example of acquired face information on the users.

The method of recording the viewing information on the registered users according to the present embodiment will be described along the flowchart of FIG. 14. In the following description, note that a descriptive content that overlaps descriptive contents of the first to third embodiments will be omitted in principle.

At step S3001, imaging captures for the users who are viewing the contents of the information processor 100 are started. Specifically, when the contents information or others is displayed on the display 117 of the information processor 100 by operation of a power switch on a main body of the processor or a power button on a remote controller, the image-capturing unit 140 starts the image captures for the users who are viewing the contents of the information processor 100. FIG. 15 shows a case in which, for example, a plurality of users 931 to 933 are viewing the contents information displayed on the information processor 100. The image-capturing unit 140 captures the images of these users 931 to 933 to create, for example, a user image 901 as shown in FIG. 16. When the image-capturing unit 140 starts the image captures for the users 931 to 933, the process flow proceeds to step S3002.

At step S3002, the information processor 100 acquires the viewing information on the registered users. This viewing information includes various pieces of information on the registered users described here, such as the registered user information, the cumulative viewing time, the viewing limit time, the consecutive viewing time, the consecutive viewing limit time, and the predetermined break time. The registered user information described here is, for example, the face information on the registered users.

When the viewing information on the registered users is recorded in the information storage 125, the controller 114 acquires various pieces of information on the registered users from the information storage 125. When the viewing information on the registered users is recorded in, for example, the server 1050 on the external network 1040, the controller 114 acquires the viewing information on the registered users from, for example, the server 1050 on the external network 1040 via the communication I/F 113 or the mobile communication I/F 131. Note that the controller 114 acquires the viewing information on all the registered users who have been registered in the information processor 100. Note that the process at step S3002 may be carried out prior to the process at step S3001. Subsequently, the process flow proceeds to step S3003.

At step S3003, the registered users are detected from the images captured by the image-capturing unit 140. Specifically, the image-capturing unit 140 extracts face information 941 to face information 943 on the respective registered users as the user information from the user image 901. To the controller 114, the image-capturing unit 140 outputs the extracted face information 941 to face information 943. Alternatively, the image-capturing unit 140 may output the user image 901 to the controller 114, and the controller 114 may extract the face information 941 to face information 943. In the extraction of the face information 941 to face information 943, the controller 114 and the image-capturing unit 140 may detect directions of the registered users' faces or lines of sights of the registered users.

Based on the user information and the registered user information, the controller 114 then determines whether the users are the registered users. Specifically, the controller 114 compares the face information 941 to face information 943 serving as the user information (face information) with the registered user information acquired at step S3002. The controller 114 determines users whose face information 941 to face information 943 match the registered user information as the registered users, and determines users who face information 941 to face information 943 do not match the registered user information as users other than the registered users. The controller 114 detects the registered users in this manner.

During activation of the information processor 100, the image-capturing unit 140 captures the images of the users who are viewing the contents information displayed on the display 117 several times, for example, consecutively. Every time the image-capturing unit 140 captures the images of the users, the controller 114 determines whether the user who is viewing the contents information is the registered user, and detects the registered user. Such a registered user detection process is carried out during the activation of the information processor 100. When the registered users are detected in this manner, the process flow proceeds to step S3004.

At step S3004, measurement of the viewing time of the registered users who have been detected at step S3003 is started. Specifically, the viewing time measuring unit 170 measures a time during which the user is determined to be the registered user at step S3003, as the viewing time. At this step, when a plurality of registered users are detected, the viewing time measuring unit 170 simultaneously measures the viewing time of each of the registered users.

Note that the viewing time measuring unit 170 may measure the viewing time in accordance with the direction of the face of the registered user detected at step S3003. For example, the viewing time measuring unit 170 measures the viewing time when the registered user faces the direction of the information processor 100, and does not need to measure the viewing time when the registered user does not face the direction of the information processor 100.

The viewing time measuring unit 170 may measure the viewing time in accordance with the direction of the line of sight of the registered user detected at step S3003. For example, the viewing time measuring unit 170 measures the viewing time when the line of sight of the registered user is directed at the information processor 100, and does not need to measure the viewing time when the line of sight of the registered user is not directed at the information processor 100.

When the registered user who has been already detected by the information processor 100 is not detected only for a short period of time that is shorter than the predetermined period of time but is then detected again, the viewing time measuring unit 170 may measure such periods of time including the period of time when the user has not been detected, as the viewing time (consecutive viewing time). When measurement of the registered user's viewing time is started in this manner, the process flow proceeds to step S3005.

At step S3005, when there is the registered user who is not detected during the viewing time measurement, the viewing time measuring unit 170 stops the measurement of the viewing time of this registered user. The viewing time measuring unit 170 consecutively measures the viewing time of the different registered user. When the measurement of the viewing time of the registered user who is not detected during it is stopped, the process flow proceeds to step S3006.

At step S3006, the controller 114 calculates the cumulative viewing time of the detected registered user. And, for example, the controller 114 calculate the cumulative viewing time up to current viewing by summing the viewing time of the current viewing and the cumulative viewing time that is a sum of viewing times of respective viewings up to previous viewing except for the current viewing. The controller 114 stops the calculation for the cumulative viewing time of the registered user who is not detected during it. The process flow then proceeds to step S3007.

At step S3007, the controller 114 carries out the same controls as those at step S1005 of FIG. 4. The controller 114 compares the cumulative viewing time with the viewing limit time for each registered user. When the controller 114 determines (NO) that the cumulative viewing time is shorter than the viewing limit time, the process flow proceeds to step S3009. Alternatively, if a plurality of registered users are detected, when the controller 114 determines (NO) that cumulative viewing times of all the detected users are shorter than the viewing limit time, the process flow proceeds to step S3009.

On the other hand, when the controller 114 determines (YES) that the cumulative viewing time is equal to or longer than the viewing limit time, the process flow proceeds to step S3008. Alternatively, if a plurality of registered users are detected, when the controller 114 determines (YES) that the cumulative viewing time of any registered user of the detected registered users is equal to or longer than the viewing limit time, the process flow proceeds to step S3008.

At step S3008, the controller 114 carries out the same controls as those at step S1006 of FIG. 4. The controller 114 gives the warning to the registered user whose cumulative viewing time is equal to or longer than the viewing limit time. Also when the cumulative viewing time of the registered user who is detected again after not being detected during it is equal to or longer than the viewing limit time, the controller 114 gives a warning to this registered user for limiting the contents information viewing. At this time, for example, the controller 114 may display the warning image on the periphery of the display 117, or may emit a warning sound with a smaller volume so as not to interrupt the viewing by the different user. When the warned registered user is not detected after that, the controller 114 stops the warning to this registered user. When the registered user is notified of the warning in this manner, the process flow proceeds to step S3009.

At step S3009, the controller 114 determines whether the contents information, etc., is displayed on the display 117. For example, when the controller 114 determines (YES) that the contents information is displayed on the display 117, the process flow returns to step S3003. Subsequently, the above-described steps S3003 to S3009 are executed again, so that the viewing information measuring unit 170 consecutively measures the detected registered user's viewing time, and the controller 114 consecutively calculates the detected registered user's cumulative viewing time.

On the other hand, for example, when the controller 114 determines (NO) that the contents information, etc., is not displayed on the display 117, the process flow proceeds to step S3010.

At step S3010, the same controls as those at step S1009 of FIG. 4 are executed. The viewing information measuring unit 170 stops the measurement of the detected registered user's viewing time, and the controller 114 stops the calculation of the detected registered user's cumulative viewing time.

The process flow then proceeds to step S3011. At step S3011, the image-capturing unit 140 stops the image capturing for the user.

By executing these steps S3001 to S3011, the viewing information on the registered user is recorded even when the user views the contents of the information processor 100 without carrying out the log-on operation.

Also in the present embodiment, the consecutive viewing time may be recorded as the viewing information. For example, at step S3004, the viewing time measuring unit 170 measures the viewing time as the consecutive viewing time. At step S3007, the controller 114 compares the consecutive viewing time with the consecutive viewing limit time. At step S3008, the controller 114 warns a registered user whose consecutive viewing time is equal to or longer than the consecutive viewing limit time that the user should take the break time.

According to the present embodiment, during the operation of the information processor 100, the image-capturing unit 140 automatically captures the user image so as to extract the face information from the user image created by the image-capturing unit 140. The controller 114 detects the registered user, based on the extracted face information and the registered user information.

According to this configuration, the registered user is detected without the log-on operation by the user. Therefore, even when the plurality of users are viewing the contents information, the viewing information on the registered users can be suitably recorded.

According to the present embodiment, the image-capturing unit 140 captures the image of the user who is viewing the contents information, several times, and the controller 114 detects the registered user every time the image-capturing unit 140 captures the image of the user. Meanwhile, the viewing time measuring unit 170 measures the viewing time only during a period of time in which the registered user is detected.

According to this configuration, the viewing time is measured only during the period in which the registered user views the contents information. That is, the registered user's viewing time is measured without the log off from the information processor 100 or switching off of the information processor 100 by the registered user. Thus, the viewing time measuring unit 170 can measure the accurate viewing time of the registered user. In this manner, the registered user's cumulative viewing time can be more accurately calculated, and the viewing information on the registered user can be more suitably recorded.

According to the present embodiment, the image-capturing unit 140 consecutively captures the image of the user of the information processor 100. According to this configuration, since the controller 114 consecutively detects the registered user, the viewing time measuring unit 170 can more accurately measure the detected registered user's viewing time. In this manner, the controller 114 can more accurately calculate the detected registered user's cumulative viewing time. In this manner, the viewing information on the registered user can be more suitably recorded.

According to the present embodiment, the consecutive viewing time may be recorded as the viewing information on the registered user. According to this configuration, the contents information viewing by the registered user can be limited also on the basis of the consecutive viewing time. As a result, the viewing information on the registered user can be more suitably recorded.

According to the present embodiment, when a plurality of users are registered in the information processor 100, the viewing information on the cumulative viewing and the viewing information on the consecutive viewing are recorded for each user. When detecting the registered user who is the target of the warning, the controller 114 gives the warning to the registered user who is the target of the warning. The controller 114 gives the warning to the target registered user by displaying the warning image on the periphery of the screen of the display 117 or emitting the warning sound with the smaller volume. According to this configuration, the viewing by the registered user who is the target of the warning can be limited without interrupting the contents information viewing by the different user.

Fifth Embodiment

The case of the record of the viewing information on the registered user in the individual information processor has been described above. However, in recent years, many users own a plurality of information processors such as a smartphone, a cellular phone, a personal computer, a tablet terminal, and a television. Therefore, if the viewing information on the registered user is recorded for each information processor, the viewing information on the registered user cannot be suitably recorded. In the present embodiment, a viewing information management system configured to collectively record the viewing information on the registered users in a plurality of information processors will be described.

Figure 17:
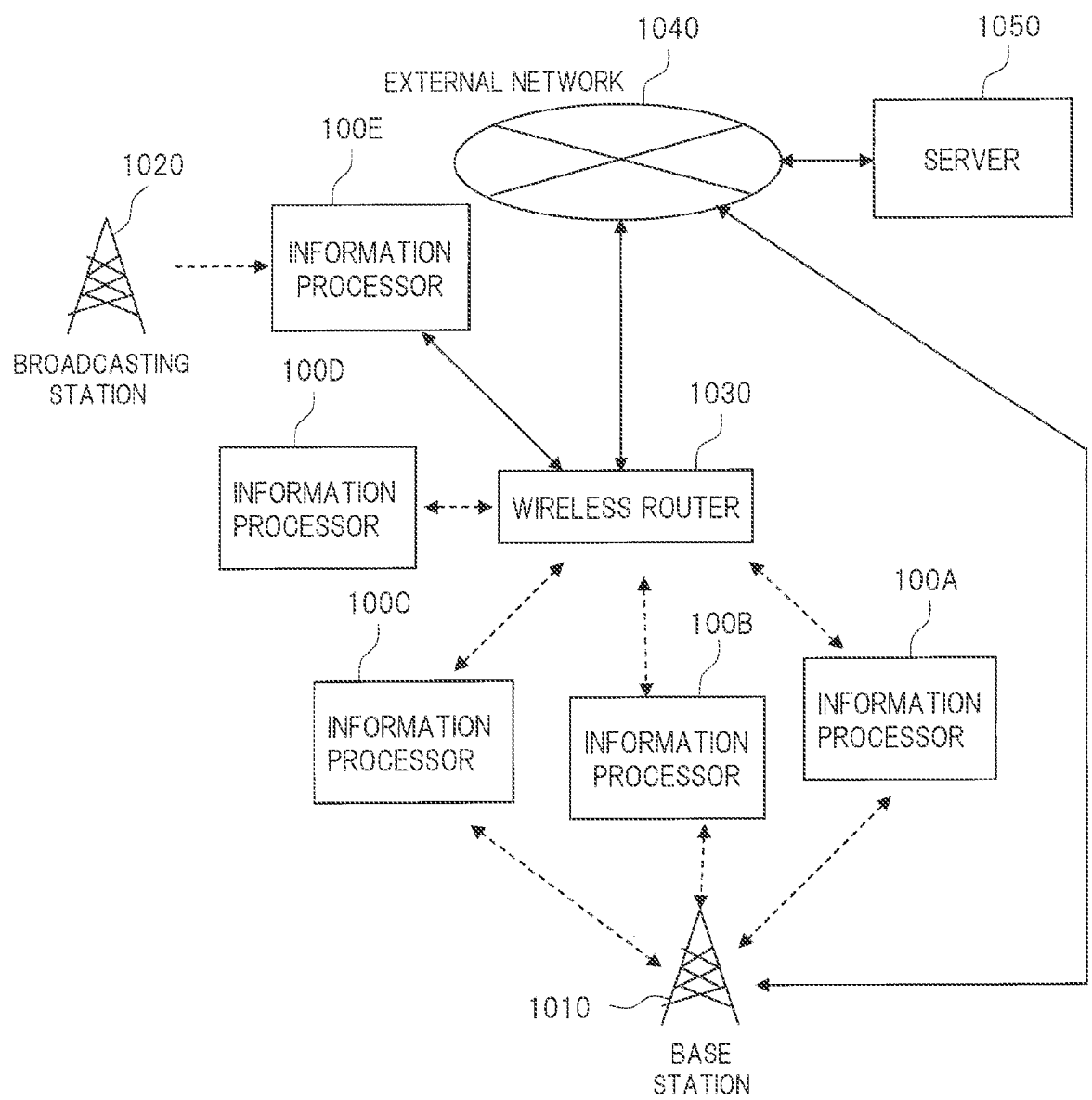
FIG. 17 is a diagram showing an example of a viewing information management system according to a fifth embodiment of the present invention.

FIG. 17 is a diagram showing an example of a viewing information management system according to the fifth embodiment of the present invention. For example, as shown in FIG. 17, the viewing information management system includes information processors 100 (100A to 100E), a base station 1010, a broadcasting station 1020, a wireless router 1030, an external network 1040, a server 1050 and others.

According to the present embodiment, the registered users are registered in the plurality of information processors 100 (100A to 100E). Each of the information processors 100A to 100C is, for example, a smartphone, a cellular phone, a personal computer, a tablet terminal, or others. The information processors 100A to 100C are each connected to the server 1050 on the external network 1040, via the base station 1010 and the mobile communication I/F 131, which serves as an information communication unit. The information processors 100A to 100C are each connected to the server 1050 on the external network, also via the wireless router 1030 and the communication I/F 113, which serves as an information communication unit. In this manner, the information processors 100A to 100C transmit/receive viewing information on the registered users, the contents information, etc., to/from the server 1050.

An information processor 100D is, for example, a device of various types connected to the server 1050 via the wireless router 1030 and the communication I/F 113 which serves as the information communication unit. The information processor 100D is therefore a piece of equipment connected to the server 1050 on the external network 1040, via the wireless router 1030 and the communication I/F 113 which serves as the information communication unit. In this manner, the information processor 100D transmits/receives the viewing information on the registered users, the contents information, etc., to/from the server 1050.

An information processor 100E is, for example, a television, etc., configured to receive electric waves (television signals) transmitted from the broadcasting station 1020 and display television broadcasting. The information processor 100E is connected to the server 1050 via the wireless router 1030 and the communication I/F 113 which serves as the information communication unit. In this manner, the information processor 100E transmits/receives the viewing information on the registered users, the contents information, etc., to/from the server 1050.

The information processors 100A to 100E are connected to the wireless router 1030 by a wired LAN or a wireless LAN. For example, in FIG. 17, the information processors 100A to 100D are connected to the wireless router 1030 by the wireless LAN, while the information processor 100E is connected to the wireless router 1030 by the wired LAN. The information processors 100A to 100E are connected to one another via the wireless router 1030.

In the present embodiment, for convenience in description, the information processor (one information processor) 100A of the plurality of information processors 100A to 100E is defined as a viewing information management apparatus. The information processors 100B to 100E transmit, for example, the viewing information on the registered users' cumulative viewing times, etc., to the information processor 100A. Based on, for example, the viewing information on the registered users' cumulative viewing times, etc., received from the information processors 100B to 100E, the information processor 100A records a plural-processor cumulative viewing time which is a sum of the registered users' cumulative viewing times in the plurality of information processors 100A to 100E. In this manner, the information processor 100A collectively records the viewing information on the registered users in the information processors 100A to 100E. Note that the information processor 100A may be, for example, an apparatus personally used by an administrative user.

Note that the configuration of the viewing information management system is not limited to such a configuration, and can be freely changed. For example, the information processors 100D and 100E may be connected to the base station 1010, and the information processors 100A to 100D may receive the electric waves from the broadcasting station 1020. Further, the viewing information management system may include six or more information processors 100 or four or fewer information processors 100.

[Method of Recording Viewing Time in Information Processor Requiring Log-On Operation]

Figure 18:
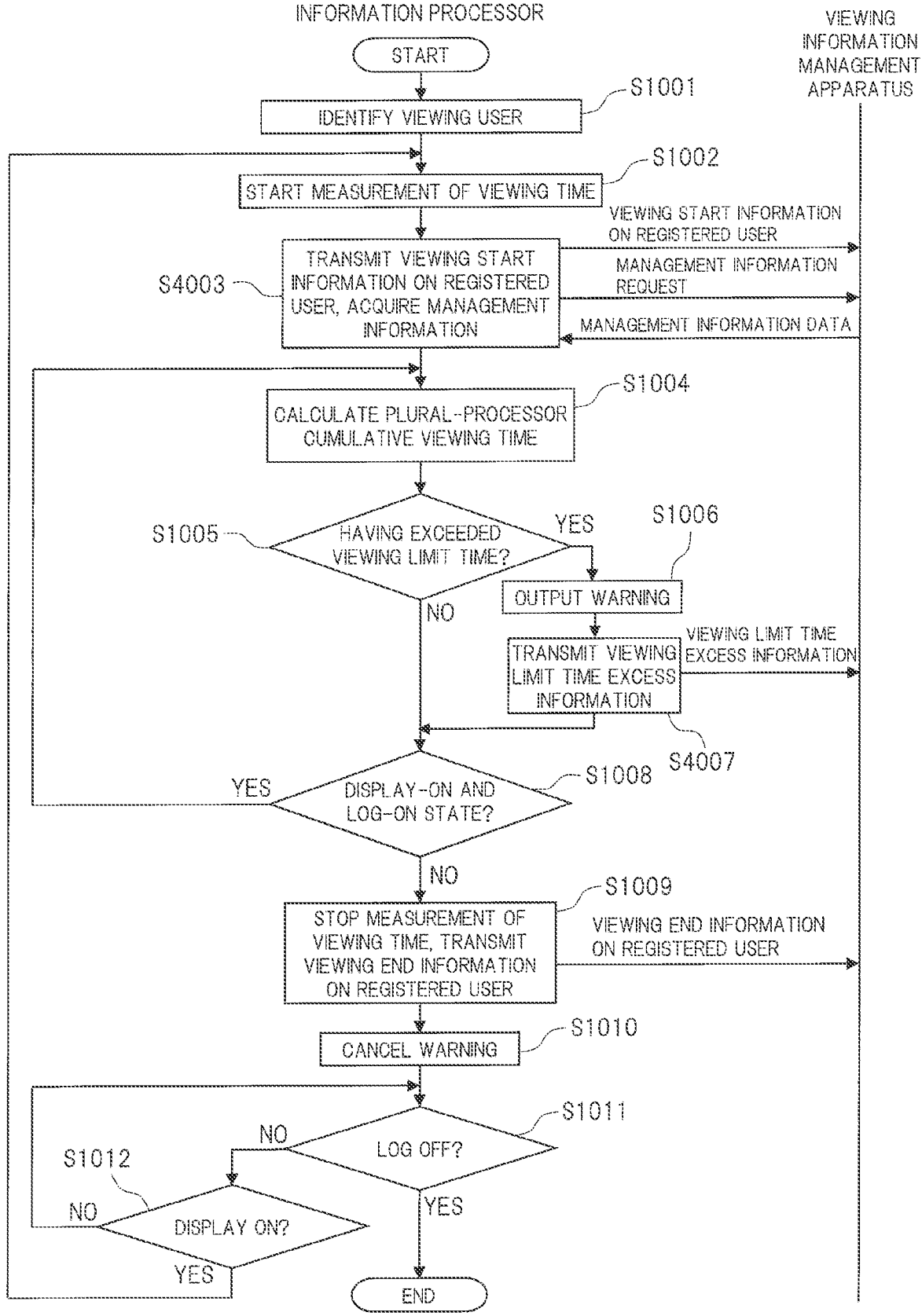
FIG. 18 is a diagram showing an example of a flowchart related to a method of recording viewing information according to the fifth embodiment of the present invention.

Next, a method of recording the viewing information on the registered users according to the present embodiment will be described. First, a method of recording the viewing time in an information processor requiring a log-on operation by a user will be described. FIG. 18 is a diagram showing an example of a flowchart related to a method of recording the viewing information according to the fifth embodiment of the present invention. FIG. 19 is a diagram showing an example of the method of recording the viewing information according to the fifth embodiment of the present invention. In the following description, note that a descriptive content that overlaps descriptive contents of the first to fourth embodiment will be omitted in principle.

Note that the registered user information on the plurality of registered users is stored, for example, in the information storage 125 of the information processor 100A through a registration operation previously carried out by the users who intend to be registered. For example, the viewing information on the registered user, such as the view limit time, the consecutive viewing limit time, and the reset time, is previously recorded in the information storage 125 of the information processor 100A by the administrative user or by the registered user himself/herself.

At step S1001, it is determined whether a user who intends to use the information processor 100 is one of the plurality of registered users who have been previously registered as the users of the information processor 100. When the information processor 100 to which the user intends to log on has not acquired the registered user information such as the passwords for the registered users yet, the registered user information is previously acquired from the information processor 100A or the server 1050.

At step S1002, when the viewing time measuring unit 170 of the information processor 100 to which the registered user has logged on starts the measurement of the viewing time of the registered user who has logged on, the process flow then proceeds to step S4003.

At step S4003, to the information processor 100A, the information processor 100 transmits, for example, the viewing start information including the identification information (e.g., the registered user information) on the registered user who has logged on, the viewing information on a contents viewing start time, the equipment identification information for identifying the information processor 100 used by the registered user, and others. Based on the equipment identification information of the received viewing start information, the information processor 100A determines, for example, whether the information processor 100 having transmitted the viewing start information is an information processor registered in the viewing information management system. When it is determined that the information processor 100 having transmitted the viewing start information is the information processor registered in the viewing information management system, the information processor 100A records the viewing start time of the registered user who has logged on, etc., in a table, as the viewing information, based on the received viewing start information. For example, as shown in FIG. 19, in the table, the information processor 100A records an ID of the currently-used information processor 100 into an equipment ID column of a currently-used equipment column, and records the viewing information on the viewing start time in the information processor 100 into a viewing start time column. And, to the information processor 100 having transmitted the viewing start information, the information processor 100A transmits information of notifying the reception of the viewing start information.

The information processor 100 requests the information processor 100A to transmit the viewing information such as the viewing limit time and the plural-processor cumulative viewing time up to the previous viewing that is a sum of the cumulative viewing times in the plurality of information processors 100 in which the registered user who has logged on is registered or in the information processors 100 (e.g., information processors 100A to 100E) registered in the viewing information management system. To these information processors 100, the information processor 100A transmits the viewing information on the registered user who has logged on. The process flow then proceeds to step S1004.

At step S1004, the viewing time in the current viewing measured at step S1002 and the plural-processor cumulative viewing time up to the previous viewing transmitted from the information processor 100A at step S4003 are summed, and the plural-processor cumulative viewing time of the registered user who has logged on is calculated. The process flow then proceeds to step S1005.

At step S1005, the controller 114 of the information processor 100 to which the registered user has logged on (i.e., contents of which have been viewed by the registered user) compares the plural-processor cumulative viewing time up to the current viewing with the viewing limit time. When the controller 114 of the information processor 100 to which the registered user has logged on determines that plural-processor cumulative viewing time up to the current viewing is equal to or longer than the viewing limit time, the process flow proceeds to step S1006.

At step S1006, the controller 114 of the information processor 100 to which the registered user has logged on gives the warning to the registered user. The process flow then proceeds to step S4007.

At step S4007, to the information processor 100A, the information processor 100 to which the registered user has logged on transmits the viewing time excess information (e.g., the plural-processor cumulative viewing time) indicating that the registered user's viewing time has exceeded the viewing limit time. The information processor 100A records the received viewing time excess information into the table. The process flow then proceeds to step S1008.

At step S1009, the viewing time measuring unit 170 of the information processor 100 to which registered user has logged on stops the measurement of the registered user's viewing time. To the information processor 100A, the information processor 100 to which the registered user has logged on transmits the viewing information such as viewing stop information indicating that the registered user has stopped viewing the contents information and the plural-processor cumulative viewing time up to the current viewing. The information processor 100A records the received viewing information such as the viewing stop information and the plural-processor cumulative viewing time, and updates the viewing information on the registered user who has stopped viewing. For example, the information processor 100A deletes the ID information on the information processor 100 recorded in the equipment ID column and the viewing information such as the viewing start time information from the table, and records the viewing information on the plural-processor cumulative viewing time up to the current viewing into the table.

The consecutive viewing time may be recorded as the viewing information on the registered user. For example, at step S4007 of FIG. 18, to the information processor 100A, the information processor 100 to which registered user has logged on transmits consecutive viewing time excess information (e.g., a break end time) indicating that the registered user's consecutive viewing time has exceeded the consecutive viewing limit time. The information processor 100A records the received consecutive viewing time excess information into the table.

[Recording of Viewing Time in Information Processor not Requiring Log-On Operation]

Figure 20:
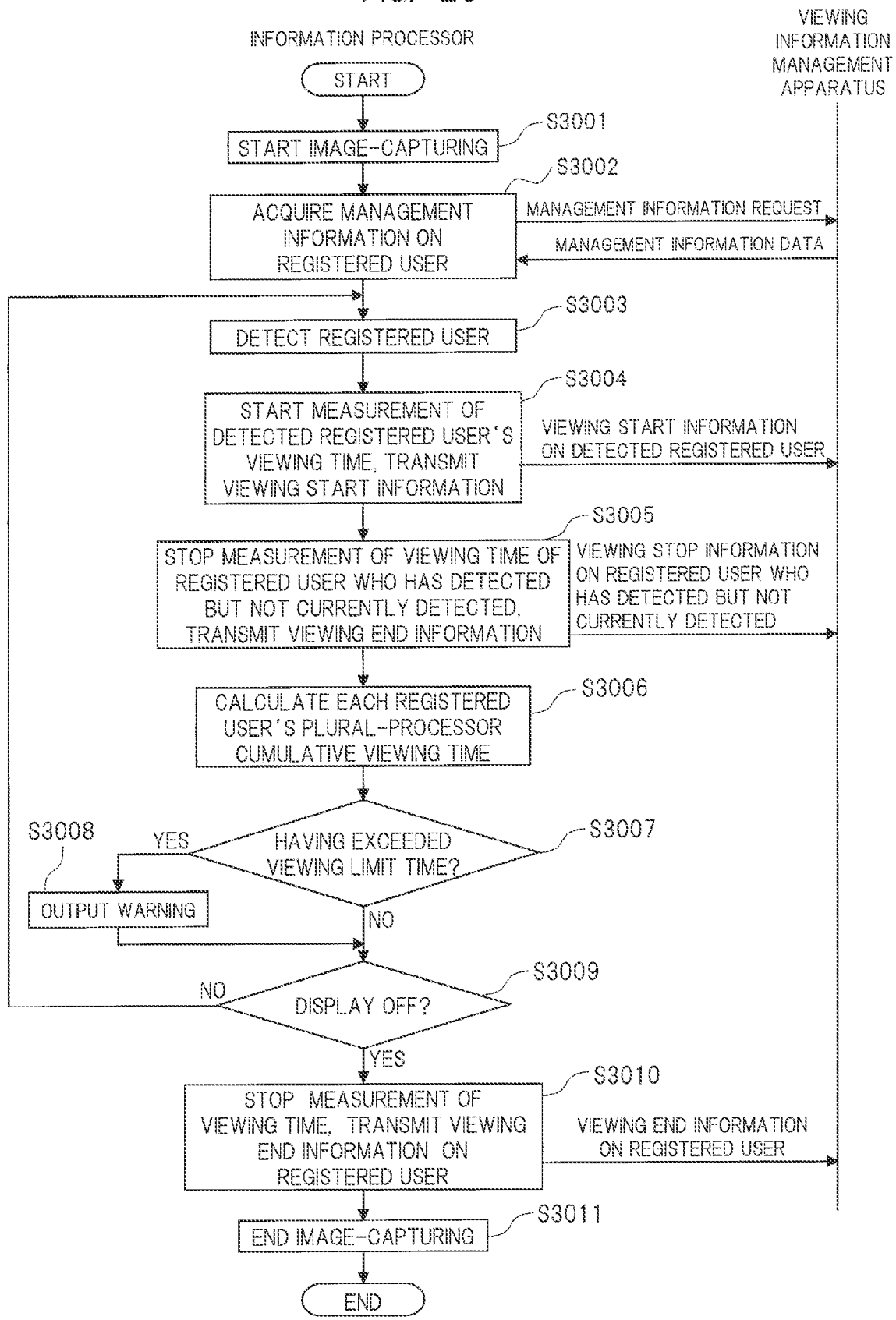
FIG. 20 is a diagram showing an example of a flowchart related to the method of recording the viewing information according to the fifth embodiment of the present invention.

Next, a method of recording the viewing time in an information processor not requiring the log-on operation by the user will be described. FIG. 20 is a diagram showing an example of a flowchart related to the method of recording the viewing information according to the fifth embodiment of the present invention. FIG. 21 is a diagram showing an example of the method of recording the viewing information according to the fifth embodiment of the present invention.

At step S3002, the information processor 100 transmits the equipment identification information for identifying the information processor 100 itself, to the information processor 100A, and requests the information processor 100A to send the viewing information on the registered user, etc. Based on the received equipment identification information, the information processor 100A determines whether the information processor 100 is equipment registered in the viewing information management system. When it is determined that the information processor 100 having transmitted the viewing start information is the equipment registered in the viewing information management system, the viewing information on the registered user such as the plural-processor cumulative viewing time up to the previous viewing and the viewing limit time is transmitted to the information processor 100. The process flow then proceeds to step S3003.

At step S3004, to the information processor 100A, the information processor 100 transmits, for example, the viewing start information including the identification information on the detected registered user (e.g., registered user information), the viewing information on the viewing start time, and the equipment identification information for identifying the information processor 100. The information processor 100A records the received viewing start information into the table. For example, as shown in FIG. 21, the information processor 100A records the ID of the information processor 100, the viewing start time in the information processor 100, and the viewing information such as the face information into the table. The information processor 100A may transmit, for example, information notifying that the viewing start information has been received, to the information processor 100 having transmitted the viewing start information.

At step S3005, when there is the registered user who is not detected during the viewing time measurement, the information processor 100 transmits the viewing stop information indicating that the registered user has stopped viewing the contents information, the plural-processor cumulative viewing time up to the current viewing and others, to the information processor 100A. The information processor 100A records the received viewing information such as the viewing stop information and the plural-processor cumulative viewing time up to the current viewing into the table, and updates the viewing information on the registered user who has stopped viewing. When it is determined that the information processor 100 having transmitted the viewing stop information and the plural-processor cumulative viewing time up to the current viewing is the equipment registered in the viewing information management system, for example, the information processor 100A deletes the ID of the information processor 100 recorded in the equipment ID column and the viewing information such as the viewing start time information from the table, and records the viewing information on the plural-processor cumulative viewing time up to the current viewing into the table. To the information processor 100, the information processor 100A may transmit information notifying that the viewing stop information and the plural-processor cumulative viewing time up to the current viewing have been received.

At step S3006, the viewing time in the current viewing measured at step S3004 and the plural-processor cumulative viewing time up to the previous viewing transmitted from the information processor 100A at step s3002 are summed, so that the plural-processor cumulative viewing time up to the current viewing of the detected registered user is calculated. The controller 114 stops the calculation for the plural-processor cumulative viewing time up to the current viewing of the registered user who is not detected during it.

Also in the present embodiment, the consecutive viewing time may be recorded as the viewing information on the registered user. For example, at step S4007 of FIG. 18, the information processor 100 transmits the consecutive viewing time excess information (e.g., the break end time) indicating that the registered user's consecutive viewing time has exceeded the consecutive viewing limit time, to the information processor 100A. Based on the received consecutive viewing time excess information, the information processor 100A records, for example, the viewing information on the break end time of the registered user into the table.

At step S3004 of FIG. 20, for example, the viewing time measuring unit 170 measures the viewing time as the consecutive viewing time. At step S3007 of FIG. 20, the controller 114 compares the consecutive viewing time with the consecutive viewing limit time. At step S3008 of FIG. 20, the controller 114 warns a registered user whose consecutive viewing time is equal to or longer than the consecutive viewing limit time that the user should takes the break time. At step S3010 of FIG. 20, the viewing time measuring unit 170 stops the measurement of the detected registered user's viewing time, and the controller 114 stops the calculation for the detected registered user's cumulative viewing time. To the information processor 100A, the information processor 100 transmits the viewing stop information indicating that the registered user has stopped viewing the contents information, the plural-processor cumulative viewing time up to the current viewing, and others.

According to the present embodiment, even when the registered user views the contents information, etc., on the plurality of information processors 100, pieces of the viewing information on the respective information processors 100 are collectively recorded into the information processor 100A serving as the viewing information management apparatus.

According to this configuration, a sum of the cumulative viewing times in the respective information processors 100 is recorded as the plural-processor cumulative viewing time. As a result, the viewing information on the registered user is more suitably recorded.

According to the present embodiment, after the reception of the plural-processor cumulative viewing time up to the previous viewing transmitted form the information processor 100A serving as the viewing information management apparatus, the plural-processor cumulative viewing time up to the current viewing is calculated in each information processor 100. Then, the plural-processor cumulative viewing time and the viewing limit time are compared with each other in each information processor 100.

According to this configuration, a frequency of accesses to the information processor 100A by the information processor 100 can be reduced, and therefore, the load on the information processor 100A can be reduced. Further, even when the information processor 100 cannot make access to the information processor 100A, the warning can be given to the registered user.

According to the present embodiment, when the registered user's consecutive viewing time has exceeded the consecutive viewing limit time, the viewing information on the break start time is recorded into the table. According to this configuration, even when the registered user intends to use a different information processor 100 during the break time, the contents information viewing or others is limited. As a result, the viewing information on the registered user can be more suitably recorded.

According to the present embodiment, the viewing information is recorded via the external network 1040. According to this configuration, the viewing by the registered user is limited even when the administrative user and the registered user are apart from each other. As a result, the viewing information is suitably recorded.

Sixth Embodiment

In the present embodiment, a case of recording the viewing information in the server 1050 serving as the viewing information management apparatus will be described.

[Method of Recording Viewing Time in Information Processor Requiring Log-On Operation]

A method of recording the viewing time in the information processor requiring the log-on operation will be described with reference to FIG. 18. In the following description, note that a descriptive content that overlaps descriptive contents of the first to fifth embodiments will be omitted in principle.

Note that the registered user information on the plurality of registered users is stored in, for example, the server 1050 through registration operations previously carried out by users who intend to be registered. The viewing information on the registered user, such as the viewing limit time, the consecutive viewing limit time, and the reset time, is previously stored in the server 1050 by the administrative user or the registered user himself/herself.

At step S4003, to the server 1050 on the external network 1040, the information processor 100 transmits, for example, the viewing start information including the identification information (e.g., registered user information) on the registered user who has logged on, the viewing information on the viewing start time, the equipment identification information for identifying the information processor 100 currently used by the registered user, and others. Based on, for example, the equipment identification information of the received viewing start information, the server 1050 determines whether the information processor 100 having transmitted the viewing start information is the equipment registered in the viewing information management system. When it is determined that the information processor 100 is the equipment registered in the viewing information management system, the server 1050 records the viewing information on the received viewing start information into the table. For example, as shown in FIG. 19, the server 1050 records the ID of the information processor 100 and the viewing information on the viewing start time and others into the table. Then, to the information processor 100, the server 1050 transmits information notifying that the viewing start information has been received.

The information processor 100 requests the server 1050 to transmit the viewing information on the registered user who has logged on and is viewing the contents information, such as the plural-processor cumulative viewing time up to the previous viewing and the viewing limit time. To the information processor 100, the server 1050 transmits the viewing information on the registered user who has logged on.

At step S4007, to the server 1050, the information processor 100 transmits the viewing time excess information (e.g., the plural-processor cumulative viewing time up to the current viewing) indicating that the registered user's viewing time has exceeded the viewing limit time. The server 1050 records the received viewing time excess information into the table.

At step S1009, to the server 1050, the information processor 100 transmits the viewing stop information indicating that the registered user has stopped viewing the contents information and the viewing information such as the plural-processor cumulative viewing time up to the current viewing. The server 1050 records the received viewing stop information and viewing information on the plural-processor cumulative viewing time up to the current viewing into the table, and updates the viewing information on the registered user who has stopped the viewing. For example, the server 1050 deletes the ID information of the information processor 100, the viewing start time information, etc., from the table, and records the viewing information on the plural-processor cumulative viewing time up to the current viewing, into the table.

[Recording of Viewing Time in Information Processor not Requiring Log-On Operation]

Next, a method of recording the viewing time in an information processor not requiring the log-on operation by the user will be described with reference to FIG. 20.

At step S3002, the information processor 100 transmits the equipment identification information for identifying the information processor 100 itself to the server 1050, and requests the server 1050 to transmit the viewing information on the registered user, etc. Based on the received equipment identification information, the server 1050 determines whether the information processor 100 is the equipment registered in the viewing information management system. When it is determined that the information processor 100 is the equipment registered in the viewing information management system, the viewing information on the registered user such as the plural-processor cumulative viewing time up to the previous viewing, the viewing limit time, and others are transmitted to the information processor 100.

At step S3004, to the server 1050, the information processor 100 transmits, for example, the viewing start information including the identification information (e.g., registered user information) on the detected registered user, the viewing information on the viewing start time, the equipment identification information for identifying the information processor 100 and others. The server 1050 records the received viewing start information into the table. For example, as shown in FIG. 21, the server 1050 records the ID of the information processor 100, the viewing information such as the viewing start time in the information processor 100 and the face information, into the table. To the information processor 100, the server 1050 may transmit, for example, information notifying that the viewing start information has been received.

At step S3005, when there is the registered user who is not detected during the viewing time measurement, the information processor 100 transmits the viewing stop information indicating that the registered user has stopped viewing the contents information, the plural-processor cumulative viewing time up to the current viewing, and others, to the server 1050. The server 1050 records the viewing information on the viewing stop information, the plural-processor cumulative viewing time up to the current viewing, and others, into the table, and updates the viewing information on the registered user who has stopped the viewing. For example, the server 1050 deletes the ID of the information processor 100 recorded in the equipment ID column and the viewing information on the viewing start time information from the table, and records the viewing information on the plural-processor cumulative viewing time up to the current viewing into the table.

Also in the present embodiment, the consecutive viewing time may be recorded as the viewing information on the registered user. For example, at step S4007 of FIG. 18, to the server 1050, the information processor 100 transmits the consecutive viewing time excess information (e.g., the break end time) indicating that the registered user's consecutive viewing time has exceeded the consecutive viewing limit time. The server 1050 records the viewing information on the received consecutive viewing time excess information into the table.

According to the present embodiment, even when the registered user views the contents information, etc., in the plurality of information processors 100, pieces of viewing information in the respective information processors 100 are collectively recorded in the server 1050 serving as the viewing information management apparatus.

According to this configuration, the sum of the cumulative viewing times in the respective information processors 100 are recorded as the plural-processor cumulative viewing time. As a result, the viewing information on the registered user is more suitably recorded. According to this configuration, it is not required in the information processor 100 to record the viewing information on the registered user, and therefore, the load on the information processor 100 is reduced.

According to the present embodiment, when the registered user's consecutive viewing time has exceeded the consecutive viewing limit time, the viewing information on the break start time is recorded into the table. According to this configuration, even when the registered user intends to use a different information processor 100 during the break time, the contents information viewing by the registered user is limited. As a result, the viewing information on the registered user can be more suitably recorded.

According to the present embodiment, the viewing information is recorded via the external network 1040. According to this configuration, the viewing information on the registered user is suitably recorded even when the administrative user and the registered user are apart from each other.

Seventh Embodiment

The sections for the above-described fifth and sixth embodiments have described the case of the calculation for the plural-processor cumulative viewing time up to the current viewing in each information processor 100. A section for the present embodiment will describe a case of calculation for the plural-processor cumulative viewing time up to the current viewing in the information processor 100A and the server 1050 serving as the viewing information management apparatus. In the following description, note that a descriptive content that overlaps descriptive contents of the first to sixth embodiments will be omitted in principle.

[Method of Recording Viewing Time in Information Processor Requiring Log-On Operation]

A method of recording the viewing time in an information processor requiring a log-on operation will be described with reference to FIG. 18. When the information processor 100A or the server 1050 receives, for example, the identification information on the registered user who has logged on and the viewing information on the viewing start time in viewing the contents information, and others, which are transmitted from the information processor 100 at step S4003 of FIG. 18, the information processor 100A or the server 1050 starts the measurement of the registered user's viewing time in the current viewing. The information processor 100A or the server 1050 also sums the registered user's viewing time in the current viewing and the plural-processor cumulative viewing time up to the previous viewing, and calculates the plural-processor cumulative viewing time up to the current viewing. The information processor 100A or the server 1050 compares the plural-processor cumulative viewing time up to the current viewing with the viewing limit time. When it is determined that the registered user's plural-processor cumulative viewing time up to the current viewing is equal to or longer than the viewing limit time, the information processor 100A or the server 1050 instructs the information processor 100, on which the registered user is viewing the contents, to give the warning to the registered user, and the information processor 100 gives the warning to the registered user, based on the instruction from the information processor 100A or the server 1050. For example, to the information processor 100, the information processor 100A or the server 1050 transmits the viewing time excess information indicating that the plural-processor cumulative viewing time up to the current viewing is equal to or longer than the viewing limit time. Then, based on the received viewing time excess information, the information processor 100 gives the warning to the registered user by carrying out the control at step S1006 of FIG. 18.

When the information processor 100A or the server 1050 receives the registered user's viewing stop information transmitted from the information processor 100 at step S1009 of FIG. 18, the information processor 100A or the server 1050 stops the measurement of the registered user's viewing time. And, the information processor 100A or the server 1050 stops the calculation for the registered user's plural-processor cumulative viewing time up to the current viewing, and records the viewing information on the plural-processor cumulative viewing time up to the current viewing into the table.

[Recording of Viewing Time in Information Processor not Requiring Log-On Operation]

Next, a method of recording the viewing time in an information processor not requiring a log-on operation by the user will be described with reference to FIG. 20. Also in this case, the information processor 100A or the server 1050 carries out almost the same controls as those in the case requiring the log-on operation. For this reason, differences in the controls from the case requiring log-on operation will hereinafter be described.

When the information processor 100A or the server 1050 receives, for example, the identification information on the detected registered user and the viewing information on the viewing start time, and others, which are transmitted from the information processor 100 at step S3004 of FIG. 20, the information processor 100A or the server 1050 starts the measurement of the detected registered user's viewing time in the current viewing. The information processor 100A or the server 1050 also sums the registered user's viewing time in the current viewing and the plural-processor cumulative viewing time up to the previous viewing, and calculates the plural-processor cumulative viewing time up to the current viewing. When it is determined that the plural-processor cumulative viewing time up to the current viewing is equal to or longer than the viewing limit time, the information processor 100A or the server 1050 instructs the information processor 100 to give the warning to the registered user. The information processor 100 gives the warning to the registered user by carrying out the control at step S3008 of FIG. 20 based on the received viewing limit time excess information. When it is determined that the registered user's plural-processor cumulative viewing time up to the current viewing is equal to or longer than the viewing limit time, the information processor 100A or the server 1050 instructs the information processor 100, on which the registered user is viewing the contents, to give the warning to the registered user, and the information processor 100 gives the warning to the registered user, based on the instruction from the information processor 100A or the server 1050. For example, to the information processor 100, the information processor 100A or the server 1050 transmits the viewing limit time excess information indicating that the plural-processor cumulative viewing time up to the current viewing is equal to or longer than the viewing limit time. Then, based on the received viewing limit time excess information, the information processor 100 gives the warning to the registered user by carrying out the controls of step S3008 of FIG. 20.

When receiving the viewing stop information on the registered user, the viewing stop information being transmitted from the information processor 100 at step S3005 of FIG. 20, the information processor 100A or the server 1050 stops the measurement of the registered user's viewing time.

The information processor 100A or the server 1050 may measure the registered user's consecutive viewing time. The information processor 100A or the server 1050 measures the registered user's consecutive viewing time, and compares the consecutive viewing time with the consecutive viewing limit time. When it is determined that the registered user's consecutive viewing time is equal to or longer than the consecutive viewing limit time, the information processor 100A or the server 1050 instructs the information processor 100 to give the warning to the registered user. For example, to the information processor 100, the information processor 100A or the server 1050 transmits the consecutive viewing limit time excess information indicating that the consecutive viewing time is equal to or longer than the consecutive viewing limit time. Based on the received consecutive viewing limit time excess information, the information processor 100 gives the warning to the registered user by carrying out the controls of step S1006 of FIG. 18 or of step 3008 of FIG. 20.

When receiving the viewing stop information on the registered user, the viewing stop information being transmitted from the information processor 100 at step S1009 of FIG. 18 or step S3005 of FIG. 20, the information processor 100A or the server 1050 stops the measurement of the registered user's consecutive viewing time.

According to the present embodiment, the plural-processor cumulative viewing time and the consecutive viewing time are calculated in the information processor 100A or the server 1050 each of which serves as the viewing information management apparatus. According to this configuration, each information processor 100 does not have to calculate the plural-processor cumulative viewing time and the consecutive viewing time. As a result, load on the information processor 100 is reduced.

According to the present embodiment, when the information processor 100A or the server 1050 compares the plural-processor cumulative viewing time up to the current viewing with the viewing limit time and it is determined that the plural-processor cumulative viewing time up to the current viewing exceeds the viewing limit time, the information processor 100A or the server 1050 instructs the information processor 100 to give the warning to the registered user. According to this configuration, the information processor 100 gives the warning based on the instruction from the information processor 100A or the server 1050, so that the viewing of the contents information by the registered user is limited. As a result, the viewing information on the registered user is suitably recorded.

According to the present embodiment, when the information processor 100A or the server 1050 compares the consecutive viewing time with the consecutive viewing limit time and it is determined that the consecutive viewing time exceeds the consecutive viewing limit time, the information processor 100A or the server 1050 instructs the information processor 100 to warn the registered user that the registered user should take a predetermined break time. According to this configuration, the information processor 100 gives the warning based on the instruction from the information processor 100A or the server 1050, so that the warning makes the registered user take a suitable break. As a result, the viewing information on the registered user is more suitably recorded.

Other Embodiments

Applications of the present invention are not limited to the above-described embodiments. For example, the wireless router 1030 may be provided with a storage, and the viewing information on the registered user may be recorded in the storage. In such a case, in comparison to the case of the information processor 100 serving as the viewing information management apparatus, power is stably supplied to the wireless router 1030. Further, because the network connection between the information processor 100 (e.g., information processors 100A to 100E) and the wireless router 1030 is stable, quick response to the viewing-information transmission request from the information processor 100 is achieved.

In the foregoing, the invention made by the present inventors has been concretely described on the basis of the embodiments. However, it is needless to say that the present invention is not limited to the foregoing embodiments, and various alternations can be made within the scope of the present invention.

Note that the present invention is not limited to the above-described embodiments, and includes various modification examples. For example, the above-described embodiments have been explained in detail for easily understanding the present invention, and are not always limited to the ones including all structures explained above.

Also, a part of the structure of one embodiment can be replaced with the structure of another embodiment, and besides, the structure of another embodiment can be added to the structure of one embodiment. Further, another structure can be added to/eliminated from/replaced with a part of the structure of each embodiment. Note that each member and a relative size shown in the drawings are simplified and idealized for understandably explaining the present invention, and therefore, more complicated shapes are provided on implementation in some cases.

EXPLANATION OF REFERENCE CHARACTERS 100, 100A, 100B, 100C, 100D, 100E . . . information processor, 114 . . . controller, 115 . . . information input unit, 116 . . . user information acquiring unit, 117 . . . display, 125 . . . information storage, 140 . . . image-capturing unit, 1010 . . . base station, 1020 . . . broadcasting station, 1030 . . . wireless router, 1040 . . . external network, 1050 . . . server

The invention claimed is:

1. A system, comprising:
a first information processing terminal including:
a user information acquiring unit configured to acquire user information;
a first display;
a first transceiver; and
a first controller,
a second information processing terminal including:
a second controller to register information relating to a user of the first information processing terminal and set a viewing limit time for the first information processing terminal; and
a second transceiver to send viewing limit time information on the viewing limit time to the first information processing terminal, and
a server connected with the first information processing terminal and the second information processing terminal,
wherein the first controller is configured to execute user authentication by using previously registered user information and the user information acquired by the user information acquiring unit and thereafter control the first display to display contents information and measure a viewing time of the contents information displayed by the first display, cumulative viewing time information based on the viewing time being sent to the second information processing terminal via the server,
wherein, in a case where the first transceiver receives the viewing limit time information on the viewing limit time from the second information processing terminal via the server and the first controller is configured to determine that the viewing time under measurement is equal to or longer than the viewing limit time set by the second information processing terminal, the first controller is configured to stop displaying the contents information on the first display, and
wherein the first controller is configured to cancel a limit of viewing in response to elapsing of arbitrary time after stop displaying the contents information on the first display.

2. The system according to claim 1,
wherein the user information acquiring unit is configured to acquire a password input as the user information.

3. The system according to claim 1,
wherein the user information acquiring unit has a biosensor, and is configured to acquire biological information as the user information.

4. The system according to claim 1,
wherein the user information acquiring unit has an image sensor, and is configured to acquire face information as the user information, the face information being extracted from an image of a user captured and created by the image sensor.

5. The system according to claim 1,
wherein the viewing time is a time while the contents information created by an application program is displayed on the display or an elapsed time from a viewing start time of the contents information which is created by the application and displayed on the first display.

6. The system according to claim 1,
wherein the first information processing terminal further comprises a clock function, and
wherein the first controller is configured to measure the viewing time based on time information by the clock function.

7. The system according to claim 1,
wherein the second transceiver receives the cumulative viewing time information based on the viewing time from the first information processing terminal via the server.

8. The system according to claim 1,
wherein the second transceiver receives information that the viewing time under measurement of the first information processing terminal is equal to or longer than the viewing limit time set by the first information processing terminal.

9. A system, comprising:
a first information processing terminal including:

a user information acquiring unit configured to acquire user information;
a first display;
a first transceiver; and
a first controller,
a second information processing terminal including:
a second display;
a second transceiver; and
a second controller,
a third information processing terminal including:
a third controller to register information relating to a user of the first information processing terminal and the second information processing terminal and set a viewing limit time for the first information processing terminal and the second information processing terminal; and
a third transceiver to send viewing limit time information on the viewing limit time to the first information processing terminal and the second information processing terminal, and
a server connected with the first information processing terminal, the second information processing terminal and the third information processing terminal,
wherein the first controller is configured to execute user authentication by using previously registered user information and the user information acquired by the user information acquiring unit and thereafter control the first display to display contents information and measure a viewing time of the contents information displayed by the first display, and
wherein, in a case where the first transceiver receives first viewing information including a first viewing time of the second information processing terminal in which the registered user information is registered and the viewing limit time information on the viewing limit time from the third information processing terminal via the server and the first controller is configured to determine that a first cumulative viewing time calculated by summing the first viewing time and the viewing time under measurement is equal to or longer than the viewing limit time set by the third information processing terminal, the first controller is configured to stop displaying the contents information on the first display.

10. The system according to claim 9,
wherein the first information processing terminal further comprises a storage, and
wherein the first controller is configured to control the storage to store the first viewing information received by the first transceiver.

11. The system according to claim 9,
wherein the user information acquiring unit is configured to acquire a password input as the user information.

12. The system according to claim 9,
wherein the user information acquiring unit has a biosensor, and is configured to acquire biological information as the user information.

13. The system according to claim 9,
wherein the user information acquiring unit has an image sensor, and is configured to acquire face information as the user information, the face information being extracted from an image of a user captured and created by the image sensor.

14. The system according to claim 9,
wherein the viewing time is a time while the contents information created by an application program is displayed on the display or an elapsed time from a viewing start time of the contents information which is created by the application and displayed on the first display.

15. The system according to claim 9,
wherein the first information processing terminal further comprises a clock function, and
wherein the first controller is configured to measure the viewing time based on time information by the clock function.

16. The system according to claim 9,
wherein the first controller is configured to cancel a limit of viewing in response to elapsing of arbitrary time after stop displaying the contents information on the first display.

17. The system according to claim 9,
wherein the second transceiver receives the cumulative viewing time information based on the viewing time from the first information processing terminal via the server.

18. The system according to claim 9,
wherein the second transceiver receives information that the viewing time under measurement of the first information processing terminal is equal to or longer than the viewing limit time set by the first information processing terminal.

19. The system according to claim 9,
wherein the first viewing information is information on measured time by the second information processing terminal while another contents information created by another application program of the second information processing terminal is displayed on the second display or an elapsed time from another viewing start time of the another contents information which is created by the application of the second information processing terminal and displayed on the second display.

20. A system, comprising:
a first information processing terminal including:
a user information acquiring unit configured to acquire user information;
a first display;
a first transceiver; and
a first controller,
a second information processing terminal including:
a second controller to register information relating to a user of the first information processing terminal and set a viewing limit time for the first information processing terminal; and
a second transceiver to send viewing limit time information on the viewing limit time to the first information processing terminal, and
a server connected with the first information processing terminal and the second information processing terminal,
wherein the first controller is configured to execute user authentication by using previously registered user information and the user information acquired by the user information acquiring unit and thereafter control the first display to display contents information and measure a viewing time of the contents information displayed by the first display, cumulative viewing time information based on the viewing time being sent to the second information processing terminal via the server,
wherein, in a case where the first transceiver receives the viewing limit time information on the viewing limit time from the second information processing terminal via the server and the first controller is configured to determine that the viewing time under measurement is equal to or longer than the viewing limit time set by the second information processing terminal, the first controller is configured to stop displaying the contents information on the first display, and wherein the first controller is configured to cancel a limit of viewing at a predetermined time after stop displaying the contents information on the first display.

21. The system according to claim 20,
wherein the user information acquiring unit is configured to acquire a password input as the user information.

22. The system according to claim 20,
wherein the user information acquiring unit has a biosensor, and is configured to acquire biological information as the user information.

23. The system according to claim 20,
wherein the user information acquiring unit has an image sensor, and is configured to acquire face information as the user information, the face information being extracted from an image of a user captured and created by the image sensor.

24. The system according to claim 20,
wherein the viewing time is a time while the contents information created by an application program is displayed on the display or an elapsed time from a viewing start time of the contents information which is created by the application and displayed on the first display.

25. The system according to claim 20,
wherein the first information processing terminal further comprises a clock function, and
wherein the first controller is configured to measure the viewing time based on time information by the clock function.

26. The system according to claim 20,
wherein the second transceiver receives the cumulative viewing time information based on the viewing time from the first information processing terminal via the server.

27. The system according to claim 20,
wherein the second transceiver receives information that the viewing time under measurement of the first information processing terminal is equal to or longer than the viewing limit time set by the first information processing terminal.

28. A system, comprising:
a first information processing terminal including:
 a user information acquiring unit configured to acquire user information;
 a first display;
 a first transceiver; and
 a first controller,
a second information processing terminal including:
 a second display;
 a second transceiver; and
 a second controller,
a third information processing terminal including:
 a third controller to register information relating to a user of the first information processing terminal and the second information processing terminal and set a viewing limit time for the first information processing terminal and the second information processing terminal; and
 a third transceiver to send viewing limit time information on the viewing limit time to the first information processing terminal and the second information processing terminal, and
a server connected with the first information processing terminal, the second information processing terminal and the third information processing terminal, wherein the first controller is configured to execute user authentication by using previously registered user information and the user information acquired by the user information acquiring unit and thereafter control the first display to display contents information and measure a viewing time of the contents information displayed by the first display, wherein, in a case where the first transceiver receives first viewing information including a first viewing time of the second information processing terminal in which the registered user information is registered and the viewing limit time information on the viewing limit time from the third information processing terminal via the server and the first controller is configured to determine that a first cumulative viewing time calculated by summing the first viewing time and the viewing time under measurement is equal to or longer than the viewing limit time set by the third information processing terminal, the first controller is configured to stop displaying the contents information on the first display, and wherein the first controller is configured to cancel a limit of viewing at a predetermined time after stop displaying the contents information on the first display.

29. The system according to claim 28,
wherein the first information processing terminal further comprises a storage, and
wherein the first controller is configured to control the storage to store the first viewing information received by the first transceiver.

30. The system according to claim 28,
wherein the user information acquiring unit is configured to acquire a password input as the user information.

31. The system according to claim 28,
wherein the user information acquiring unit has a biosensor, and is configured to acquire biological information as the user information.

32. The system according to claim 28,
wherein the user information acquiring unit has an image sensor, and is configured to acquire face information as the user information, the face information being extracted from an image of a user captured and created by the image sensor.

33. The system according to claim 28,
wherein the viewing time is a time while the contents information created by an application program is displayed on the display or an elapsed time from a viewing start time of the contents information which is created by the application and displayed on the first display.

34. The system according to claim 28,
wherein the first information processing terminal further comprises a clock function, and
wherein the first controller is configured to measure the viewing time based on time information by the clock function.

35. The system according to claim 28,
wherein the first controller is configured to cancel a limit of viewing at a predetermined time after stop displaying the contents information on the first display.

36. The system according to claim 28,
wherein the second transceiver receives the cumulative viewing time information based on the viewing time from the first information processing terminal via the server.

37. The system according to claim 28,
wherein the second transceiver receives information that the viewing time under measurement of the first information processing terminal is equal to or longer than the viewing limit time set by the first information processing terminal.

38. The system according to claim 28,
wherein the first viewing information is information on measured time by the second information processing terminal while another contents information created by another application program of the second information processing terminal is displayed on the second display or an elapsed time from another viewing start time of the another contents information which is created by the application of the second information processing terminal and displayed on the second display.

* * * * *